United States Patent
Ohashi

(10) Patent No.: US 12,366,721 B2
(45) Date of Patent: Jul. 22, 2025

(54) IMAGING LENS, CAMERA, AND MOBILE INFORMATION TERMINAL APPARATUS

(71) Applicant: Kazuyasu Ohashi, Chiba (JP)

(72) Inventor: Kazuyasu Ohashi, Chiba (JP)

(73) Assignee: RICOH COMPANY, LTD., Tokyo (JP)

( * ) Notice: Subject to any disclaimer, the term of this patent is extended or adjusted under 35 U.S.C. 154(b) by 381 days.

(21) Appl. No.: 17/794,988

(22) PCT Filed: Dec. 16, 2020

(86) PCT No.: PCT/IB2020/061993
§ 371 (c)(1),
(2) Date: Jul. 25, 2022

(87) PCT Pub. No.: WO2021/165739
PCT Pub. Date: Aug. 26, 2021

(65) Prior Publication Data
US 2023/0093092 A1    Mar. 23, 2023

(30) Foreign Application Priority Data

Feb. 19, 2020 (JP) .................................. 2020-026382

(51) Int. Cl.
*G02B 9/04* (2006.01)
*G02B 3/12* (2006.01)
*G02B 13/18* (2006.01)

(52) U.S. Cl.
CPC ............... *G02B 9/04* (2013.01); *G02B 3/12* (2013.01); *G02B 13/18* (2013.01)

(58) Field of Classification Search
CPC . G02B 9/04; G02B 3/12; G02B 13/18; G02B 9/62; G02B 9/64; G02B 27/0025;
(Continued)

(56) References Cited

U.S. PATENT DOCUMENTS 4,394,071 A * 7/1983 Yamada ................ G02B 9/62
  359/675
4,394,073 A    7/1983 Wakamiya
(Continued)

FOREIGN PATENT DOCUMENTS

CN    101833162 A    9/2010
CN    102331618 A    1/2012
(Continued)

OTHER PUBLICATIONS

Japanese Office Action issued Oct. 3, 2023, in corresponding Japanese Application No. 2020-026382, 10pp.
(Continued)

*Primary Examiner* — Thomas K Pham
*Assistant Examiner* — Kuei-Jen L Edenfield
(74) *Attorney, Agent, or Firm* — XSENSUS LLP

(57) ABSTRACT

An imaging lens consists of: a first lens group having positive power, the first lens group including a positive lens closest to an object within the first lens group; an aperture stop; and a second lens group having positive power. The first lens group, the aperture stop, and the second lens group are disposed in that order from an object side toward an image side. Only two negative air lenses of a first biconvex air lens and a second biconvex air lens are provided within the imaging lens. The first lens group includes the first biconvex air lens, and the second lens group includes a second biconvex air lens.

11 Claims, 12 Drawing Sheets

(58) Field of Classification Search
CPC .... G02B 13/0045; G02B 27/00; G02B 13/00; G02B 9/06; G02B 13/006; G02B 9/18; G02B 9/20; G02B 9/22; G02B 9/24; G02B 9/26; G02B 9/30; G02B 9/08; G03B 17/12; G03B 30/00; H04N 23/55
USPC .................................................. 359/656–658
See application file for complete search history.

(56) References Cited

U.S. PATENT DOCUMENTS

| | | | |
|---|---|---|---|
| 4,437,734 A | | 3/1984 | Iizuka |
| 4,653,874 A * | | 3/1987 | Takahashi ...... G02B 15/143105 359/708 |
| 4,690,518 A | | 9/1987 | Kouchiwa et al. |
| 4,753,522 A | | 6/1988 | Nishina et al. |
| 4,830,474 A * | | 5/1989 | Nakayama ............ G02B 15/10 359/716 |
| 4,856,881 A * | | 8/1989 | Shiraishi ................ G02B 9/64 359/755 |
| 5,153,779 A | | 10/1992 | Ohashi |
| 5,398,135 A | | 3/1995 | Ohashi |
| 5,576,891 A | | 11/1996 | Ohashi |
| 5,581,319 A | | 12/1996 | Ohashi |
| 5,617,254 A | | 4/1997 | Ohashi |
| 5,630,188 A | | 5/1997 | Ohashi |
| 5,687,401 A | | 11/1997 | Kawamura et al. |
| 5,742,439 A * | | 4/1998 | Schuster ................ G02B 13/00 359/749 |
| 5,930,056 A | | 7/1999 | Ohashi |
| 6,353,506 B1 | | 3/2002 | Ohashi |
| 7,982,976 B2 | | 7/2011 | Asami |
| 8,570,671 B2 | | 10/2013 | Lee |
| 2002/0024745 A1 | | 2/2002 | Ohashi |
| 2002/0060855 A1 | | 5/2002 | Ohashi |
| 2002/0101665 A1 | | 8/2002 | Ohashi et al. |
| 2003/0210473 A1 | | 11/2003 | Ohashi |
| 2004/0004772 A1 | | 1/2004 | Ohashi et al. |
| 2004/0008420 A1 | | 1/2004 | Ohashi |
| 2004/0136088 A1 | | 7/2004 | Ohashi |
| 2005/0036208 A1 | | 2/2005 | Ohashi |
| 2005/0094002 A1 | | 5/2005 | Ohashi |
| 2005/0094285 A1 | | 5/2005 | Ohashi |
| 2005/0122596 A1 | | 6/2005 | Ohashi |
| 2005/0190457 A1 | | 9/2005 | Ohashi |
| 2005/0270663 A1 | | 12/2005 | Ohashi |
| 2006/0193062 A1 | | 8/2006 | Ohashi |
| 2006/0262422 A1 | | 11/2006 | Ohashi |
| 2007/0097517 A1 | | 5/2007 | Ohashi |
| 2007/0297068 A1 | | 12/2007 | Ohashi |
| 2008/0106799 A1 | | 5/2008 | Ohashi |
| 2008/0117527 A1 | | 5/2008 | Nuno et al. |
| 2008/0151385 A1 | | 6/2008 | Ohashi |
| 2008/0198477 A1 | | 8/2008 | Ohashi |
| 2008/0204894 A1 | | 8/2008 | Ohashi |
| 2009/0080088 A1 | | 3/2009 | Ohashi |
| 2009/0091841 A1 | | 4/2009 | Ohashi |
| 2010/0007967 A1 | | 1/2010 | Ohashi |
| 2010/0027136 A1 | | 2/2010 | Ohashi et al. |
| 2010/0271710 A1 | | 10/2010 | Ohashi |
| 2011/0273781 A1 | | 11/2011 | Nuno et al. |
| 2011/0310496 A1 | | 12/2011 | Kubota et al. |
| 2011/0317285 A1 | | 12/2011 | Ohashi et al. |
| 2012/0212838 A1 | | 8/2012 | Ohashi |
| 2013/0033763 A1 | | 2/2013 | Sunaga et al. |
| 2013/0194488 A1 | | 8/2013 | Kubota et al. |
| 2013/0194681 A1 | | 8/2013 | Ohashi et al. |
| 2013/0265649 A1 | | 10/2013 | Ohashi |
| 2013/0321936 A1 | | 12/2013 | Ohashi |
| 2014/0016214 A1 | | 1/2014 | Kubota et al. |
| 2014/0078605 A1 | | 3/2014 | Ohashi |
| 2014/0126072 A1 | | 5/2014 | Ohashi et al. |
| 2014/0139932 A1 | | 5/2014 | Ohashi |
| 2014/0340768 A1 | | 11/2014 | Kubota et al. |
| 2015/0062718 A1 | | 3/2015 | Ohashi |
| 2015/0103413 A1 | | 4/2015 | Uchida et al. |
| 2015/0116829 A1 | | 4/2015 | Ohashi |
| 2015/0212303 A1 | | 7/2015 | Ohashi |
| 2015/0260968 A1 | | 9/2015 | Ohashi |
| 2016/0054544 A1 | | 2/2016 | Ohashi et al. |
| 2016/0077309 A1 | | 3/2016 | Ohashi et al. |
| 2017/0235112 A1 | | 8/2017 | Ohashi |
| 2018/0196236 A1 | | 7/2018 | Ohashi et al. |
| 2019/0121062 A1 | | 4/2019 | Ohashi |
| 2019/0154946 A1 | | 5/2019 | Ohashi |
| 2020/0041762 A1 | | 2/2020 | Ohashi |
| 2022/0026670 A1 | | 1/2022 | Ohashi |

FOREIGN PATENT DOCUMENTS

| | | |
|---|---|---|
| CN | 103676093 A | 3/2014 |
| CN | 104919353 A | 9/2015 |
| EP | 0299474 A2 | 1/1989 |
| EP | 1548478 A1 | 6/2005 |
| EP | 2400334 A2 | 12/2011 |
| JP | 57-41608 A | 3/1982 |
| JP | 61-210314 A | 9/1986 |
| JP | 61-279816 A | 12/1986 |
| JP | 2-158706 | 6/1990 |
| JP | 4-161913 | 6/1992 |
| JP | 5-264899 A | 10/1993 |
| JP | 7-270679 | 10/1995 |
| JP | 2013-195587 | 9/2013 |
| JP | 2013-210571 | 10/2013 |
| JP | 2014-059466 | 4/2014 |
| JP | 2018-109667 A | 7/2018 |
| JP | 2019-095607 | 6/2019 |
| JP | 2020-144271 | 9/2020 |
| JP | 2022-513263 A | 2/2022 |
| WO | 2014/046126 A1 | 3/2014 |
| WO | 2020/127280 A1 | 6/2020 |

OTHER PUBLICATIONS

Office Action issued on Jun. 11, 2024, in corresponding European patent Application No. 20828335.8, 48 pages.
Office Action issued May 25, 2023 in Chinese Patent Application No. 202080097125.4, 10 pages.
International Search Report issued on Feb. 24, 2021 in PCT/IB2020/061993 filed on Dec. 16, 2020, 9 pages.
Notice of Allowance issued May 20, 2025 in corresponding Korean Patent Application No. 10-2022-7022449.

* cited by examiner

IMAGING LENS, CAMERA, AND MOBILE INFORMATION TERMINAL APPARATUS

CROSS-REFERENCE TO RELATED APPLICATIONS

The present application is based on PCT filing PCT/IB2020/061993, filed Dec. 16, 2020, which claims priority to Japanese Patent Application No. 2020-026382, filed Feb. 19, 2020, the entire contents of each are incorporated herein by reference.

TECHNICAL FIELD

Embodiments of the present disclosure relate to an imaging lens, a camera, and a mobile information terminal apparatus.

BACKGROUND ART

Digital cameras that form an image captured by an imaging lens onto an image sensor to perform image-capturing are widely used.

Among the digital cameras, there are strong requests for compact cameras with high image quality that use a relatively large image sensor having a diagonal length in a range of from about 20 to about 45 millimeters (mm) and that include a single-focus lens with high performance. For a further request, greater emphasis is placed on being excellent in portability, that is, being compact in addition to having high performance.

In recent years, a request increases for a compact imaging lens having an angle of view of so-called "semi-wide angle" having a half angle of view in a range of from about 25 to about 33 degrees. The semi-wide angle corresponds to a focal length in a range of from about 46 to about 33 mm in terms of a film camera having a size of 35 mm (so called Leica size).

Moreover, a relatively large image sensor has no serious disadvantage even when ambient rays are incident on a sensor obliquely by a certain degree because of improvement or optimization of an on-chip microlens and development in image processing.

Specifically, even when the angle defined between a principal ray and the optical axis at the maximum image height is in a range of from about 30 to about 40 degrees, a system that sufficiently accommodates brightness shading or color shading in a sensor peripheral area can be constructed. Thus, a lens type more suitable for a decrease in size can be selected irrespective of the normal incidence of ambient rays unlike the existing type.

In this case, examples of a lens type suitable for a decrease in size in a semi-wide angle range include a substantially symmetrical type, and a telephoto type in which a lens group having negative refractive power is disposed on an image side. PTL 1 and PTL 2 disclose such imaging lenses.

CITATION LIST

Patent Literature

[PTL 1]
JP-07-270679-A
[PTL 2]
JP-2013-195587-A

Technical Problem

However, an imaging lens disclosed in JP-7-270679-A is suitable for film cameras, but there is still room for improvement in imaging performance to be used as an imaging lens for a digital camera.

Moreover, an imaging lens disclosed in JP-2013-195587-A has a large lens total length (the distance from the surface disposed closest to an object side of a lens system to an image surface) and a large lens total thickness (the distance from the surface closest to the object side to the surface closest to an image side of the lens system), thereby being disadvantageous in terms of a decrease in size.

An object of the present disclosure is to provide a high-performance imaging lens suitable for a compact and semi-wide-angle digital camera.

Solution to Problem

An imaging lens consists of: a first lens group having positive power, the first lens group including a positive lens closest to an object within the first lens group; an aperture stop; and a second lens group having positive power. The first lens group, the aperture stop, and the second lens group are disposed in that order from an object side toward an image side. Only two negative air lenses of a first biconvex air lens and a second biconvex air lens are provided within the imaging lens. The first lens group includes the first biconvex air lens, and the second lens group includes a second biconvex air lens.

Advantageous Effects of Invention

The embodiments of the present disclosure provide a high-performance imaging lens suitable for a compact and semi-wide-angle digital camera.

BRIEF DESCRIPTION OF DRAWINGS

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF EMBODIMENTS

Figure 1:
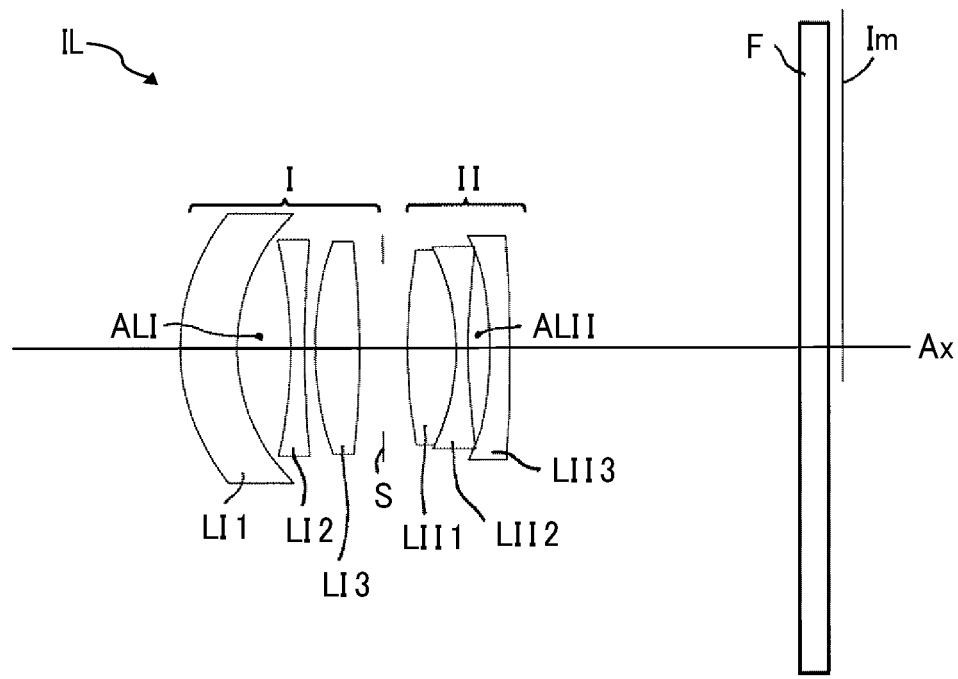
FIG. 1 is a cross-sectional view of a configuration of an imaging lens according to a first numerical example.

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

An embodiment is described below referring to the drawings. Like reference signs are applied to identical or corresponding components throughout the drawings and redundant description thereof may be omitted.

FIGS. 1 to 10 are diagrams of imaging lenses IL according to ten examples of an embodiment of the present disclosure. FIG. 1 to FIG. 10 correspond to the first numerical example to the tenth numerical example to be described below, respectively.

In FIGS. 1 to 10, the left is an object side, and the right of the drawing sheet is an image side. For the convenience of description, reference signs are commonly used in FIGS. 1 to 10.

In FIGS. 1 to 10, a first lens group I, a second lens group II, and an aperture stop S are illustrated. Further, a transparent parallel plate F is intended to be one of various kinds of filters, such as an optical low-pass filter and an infrared cut-off filter, and a cover glass (seal glass) for an image sensor, such as a complementary metal oxide semiconductor (CMOS) sensor. The transparent parallel plate is assumed to be optically equivalent to the intended component.

In FIGS. 1 to 10, an imaging plane Im corresponds to the photo-sensing surface of an image sensor when the image sensor is used.

In FIGS. 1 to 10, reference signs are assigned to lenses, respectively, in accordance with the following rules. For the lenses of the first lens group I, a j-th lens counted from a lens closest to an object in a direction to an image within the first lens group I is indicated by LIj. For the lenses of the second lens group II, a k-th lens counted from a lens closest to the aperture stop S in the direction to the image within the second group II is indicated by LIIk.

In the example of FIG. 1, j is one of 1 to 3, and k is one of 1 to 3.

The first lens group I includes an air lens ALI of a biconvex shape with negative power, and the second lens group II includes an air lens ALII of a biconvex shape with negative power. Hereinafter, the power is also referred to as refractive power.

The air lens of the present disclosure is described below.

An air lens is an air space between the surfaces of two lenses adjacent to each other, the surfaces facing each other. In other words, an air lens is an air space formed by two adjacent lens surfaces facing each other.

The imaging lens IL according to an embodiment of the present disclosure are designed to form an image of an object. In such an imaging lens IL, the air lens is formed between an image-side surface of an object-side lens and an object-side surface of an image-side lens adjacent to the object-side lens. In this case, the image-side surface and the object-side surface face each other. The image-side surface of the object-side lens is referred to as an object-side surface of the air lens, and the object-side surface of the image-side lens is referred to as an image-side surface of the air lens.

In the imaging lens IL according to an embodiment of the present disclosure, each of the first lens group I and the second lens group II includes an air lens of a biconvex shape with negative power. In other words, the lens system of the imaging lens IL includes two air lenses with negative power in total. One of the two air lenses with negative power is the air lens ALI of a biconvex shape with negative power in the first lens group I, and the other one is the air lens ALII of a biconvex shape with negative power in the second lens group II.

In each of the air lenses ALI and ALII, the object-side surface is a concave surface facing the image side, and the image-side surface is a concave surface facing the object side.

In the lens configuration illustrated in FIG. 1, the air lens ALI is formed between a lens LI1 and a lens LI2, and the air lens ALII is formed between the lens LII2 and the lens LII3.

As is clear from FIGS. 1 to 10, the imaging lens IL according to any one of the embodiments has the basic configuration as described below.

The imaging lens IL according to the embodiments consist of a positive first lens group I, an aperture stop S, and a positive second lens group II arranged in that order from the object side toward the image side. The imaging lens IL further includes only two air lenses ALI and ALII each having negative power within the whole system.

The two air lenses ALI and ALII each having negative power both have a biconvex shape. One is within the first lens group I, and the other is within the second lens group II. The lens LI1 closest to an object within the first lens group I is a positive lens.

The imaging lens IL according to any one of the embodiments of the present disclosure is a semi-wide angle lens having characteristics slightly closer than a substantially symmetrical type to a telephoto type. With such a proper lens configuration and power arrangement not found in related art, the imaging lens IL according to any one of the embodiments achieves a decrease in all the lens total length, lens total thickness, and lens diameter.

Each of the first lens group I with positive power and the second lens group II with positive power includes one air lens with negative refractive power. This arrangement enables a substantially symmetrical power arrangement with respect to a stop, and also enables the adaptability to a relatively wide angle of view. In the imaging lens IL with such properties and characteristics, coma aberration, distortion, and lateral chromatic aberration are easily corrected.

Further, the two air lenses ALI and ALII each have a biconvex shape. This configuration enables correction of various aberrations at a higher degree.

The convex object-side surface of the air lens ALI of the first lens group I enables an appropriate control of spherical aberration and also allows astigmatism in particular to be easily corrected. Further, the convex image-side surface of the air lens ALII of the second lens group II enables a control of a distance to the exit pupil, and also provides an appropriate incident angle of a principal ray reaching a peripheral image height with respect to the imaging plane Im. Further, coma aberration and distortion are particularly easily corrected.

The convex image-side surface of the air lens ALI of the first lens group I achieves a reduction in the diameter of the lens closest to the object in the lens system and allows coma aberration of lower light rays to be easily corrected. The convex object-side surface of the air lens ALII of the second lens group II achieves a reduction in the diameter of the lens closest to the image in the lens system and allows coma aberration of upper light rays to be easily corrected. These convex surfaces are advantageous to smaller size and higher performance of the imaging lens. The biconvex air lens of each of the first lens group I and the second lens group II has a highly advantageous effect of correcting aberration as described above. This enables the air lenses with negative power to be gathered into two air lenses ALI and ALII, and allows a simple lens configuration as a whole, thus facilitating the downsizing of the imaging lens.

To attain a decrease in size of the semi-wide angle imaging lens, there is a need to change the power arrangement of the substantially symmetrical type and to apply power arrangement close to so-called telephoto type.

In the imaging lens IL according to at least one embodiment, a lens-shutter unit is often provided at the position of the aperture stop S, and the aperture stop is to be downsized. To achieve such a reduction in size, positive power is to be allocated at a position closest to the object within the first lens group I.

In the imaging lens IL according to at least one embodiment of the present disclosure, a positive lens (lens LI1) is disposed closest to an object to be observed within the lens system. This enables power arrangement close to the telephoto type, thus achieving a reduction in the lens total length and a reduction in the diameter of the aperture stop S.

As described above, the imaging lens IL according to at least one embodiment has the configurations of the respective components optimized for the purpose of use, which synthetically leads to advantageous effects not found in related art, thus attaining an increase in diameter, a decrease in size, and an increase in performance.

In the imaging lens IL according to at least one embodiment, the first lens group I disposed closer to the object than the aperture stop S consists of three to five lenses as a whole, and the second lens group II disposed closer to the image than the aperture stop S consists of three to four lenses as a whole.

The number of lenses constituting each of the first lens group I and the second lens group II is not limited to these numbers.

As a matter of course, a simpler configuration is more suitable for a reduction in size. However, a configuration in which each of the first lens group I and the second lens group II consists of two lenses is difficult to achieve intended imaging performance.

To achieve a reduction in size and intended performance, the above-described example number of lenses constituting each of the first lens group I and the second lens group II are desired. It is desired that the whole system of the imaging lens IL includes four or less air lenses in total including two negative air lenses ALI and ALII.

With an increasing number of air lenses included in the imaging lens IL, the imaging performance more likely deteriorates due to the lens distance or relative lens decentering. In some embodiments, adjacent lenses are cemented together to form a compound lens as desired so as to include four or less air lenses in the imaging lens IL as a whole. This allows a stable performance to be easily obtained in actual production.

The imaging lens IL with the above described configurations, according to an embodiment satisfies conditional expressions (1) and (2) below:

$$-0.9 < (r1o + r1i)/(r1o - r1i) < -0.2 \quad (1)$$

$$-0.2 < (r2o + r2i)/(r2o - r2i) < 0.9 \quad (2)$$

The reference signs used in parameters of the conditional expressions (1) and (2) are described as follows.
r1o denotes radius of curvature of the object-side surface of the biconvex air lens ALI of the first lens group I;
r1i denotes radius of curvature of the image-side surface of the biconvex air lens ALI of the first lens group I;
r2o denotes radius of curvature of the object-side surface of the biconvex air lens ALII of the second lens group II; and
r2i denotes radius of curvature of the image-side surface of the biconvex air lens ALII of the second lens group II.

The imaging lens IL according to an embodiment satisfies at least one of conditional expressions (3) and (4) below: It is desired that the imaging lens IL according to at least one embodiment satisfy the conditional expressions (1) and (2) together with at least one of the condition (3) and (4).

$$1.0 < L/f < 1.6 \quad (3)$$

$$0.45 < DT/f < 0.80 \quad (4)$$

The reference signs used in parameters of the conditional expressions (3) and (4) are described as follows.
f denotes focal length of a whole system of the imaging lens IL focused on an object at infinity;
L denotes a distance between a surface closest to the object within the first lens group I and the imaging plane Im in the imaging lens IL focused on the object at infinity; and
DT denotes a distance between the surface closest to the object within the first lens group I and a surface closest to an image within the second lens group II.

As described above, the lens LI1 disposed closest to the object within the first lens group I is a positive lens, and its object-side surface is convex.

In this case, in addition to the conditional expressions (1) and (2), conditional expression 5 below is also satisfied. Alternatively, in addition to at least one of the conditional expressions (3) and (4), the conditional expression 5 below is also satisfied. Still alternatively, in addition to the conditional expressions (1) and (2) and at least one of the conditional expressions (3) and (4), the conditional expression (5) below is also satisfied:

$$0.25 < r1F/f < 0.55 \quad (5)$$

The reference signs used in parameters of the conditional expression (5) are described as follows.

r1F denotes radius of curvature of the object-side surface of the positive lens LI1 closest to the object within the first lens group I; and f denotes focal length of the entirety of the imaging lens IL focused on an object at infinity.

When the conditional expression (5) is satisfied, it is desired that in addition to the conditional expression (5), conditional expression (6) below is also satisfied (i.e., the parameter "r1F/r1o" falls within the range defined by conditional expression (6) below):

$$0.8 < r1F/r1o < 1.6 \quad (6)$$

In the imaging lens IL according to an embodiment, a surface closest to the image within the first lens group I and a surface closest to the object within the second lens group II are both convex. Such a convex shape of these lenses produces a biconcave air lens formed by the surface closest to the image within the first lens group I and the lens closest to the object within the second lens group II, and the biconcave air lens contains the aperture stop S thereinside. The imaging lens IL with such a configuration satisfies conditional expression (7) below:

$$-1.4 < r2s/r1s < 0.0 \quad (7)$$

The reference signs used in parameters of the conditional expression (7) are described as follows.

r1s denotes radius of curvature of the surface closest to the image within the first lens group I; and r2s denotes radius of curvature of the surface closest to the object within the second lens group II.

In some embodiments, the conditional expressions (1), (2), and (7) are satisfied at the same time. Alternatively, the conditional expression (7) and at least one of the conditional expressions (3) to (6) are satisfied. Still alternatively, the conditional expressions (1) and (2) and at least one of the conditional expressions (3) to (6) are satisfied.

The meanings of the conditional expressions (1) to (7) are described in detail below.

If the parameter of the conditional expression (1) is equal to or less than −0.9, the refractive power of the object-side surface of the air lens ALI in the first lens group I becomes relatively too strong. This would likely cause significant under-corrected spherical aberration, and also cause curvature of field to be significantly displaced in a negative direction at an intermediate image height.

If the parameter of the conditional expression (1) is equal to or greater than −0.2, the refractive power of the image-side surface of the air lens ALI in the first lens group I becomes relatively too strong. This would likely cause significant over-corrected spherical aberration, and also cause curvature of field to be significantly displaced in a positive direction in a peripheral area. Moreover, coma aberration would likely remain.

If the parameter of the conditional expression (2) is equal to or less than −0.2, the refractive power of the object-side surface of the air lens ALII in the second lens group II becomes relatively too strong. This would likely cause significant over-corrected spherical aberration, and also cause inward coma aberration to remain.

If the parameter of the conditional expression (2) is equal to or greater than 0.9, the refractive power of the image-side surface of the air lens ALIT in the second lens group II becomes relatively too strong. This would likely cause astigmatism, and also disturb coma aberration in the peripheral area of the pupil.

Satisfying the conditional expression (2) adjusts the position of the exit pupil, and the incident angle of a principal ray at a peripheral image height onto an imaging plane is set to a desired one.

Satisfying the conditional expressions (1) and (2) optimizes the shapes of the air lenses ALI and ALII, and more successfully corrects spherical aberration, astigmatism, and coma aberration, thus achieving a compact and high-performance imaging lens.

The conditional expression (3) determines the lens total length of the imaging lens IL (i.e., the distance from the surface disposed closest to the object of the lens system to the imaging plane Im), to exhibit the properties and characteristics of the imaging lens IL the most sufficiently to achieve intended performance.

The conditional expression (4) determines the lens total thickness of the imaging lens IL (i.e., the distance from the surface disposed closest to the object to the surface disposed closest to the image in the lens system), to exhibit the above-described properties and characteristics the most sufficiently to achieve intended performance.

Setting the lens total length and thickness of the imaging lens IL to satisfy the conditional expressions (3) and (4) exhibits various properties and characteristics, such as aberration correction, the most sufficiently to achieve intended performance.

As described above, the imaging lens IL according to an embodiment of the present disclosure includes a positive lens (lens LI1) disposed closest to an object to be observed within the lens system, and has a power arrangement close to the telephoto type, thus achieving a reduction in the lens total length and a reduction in the diameter of the aperture stop S.

In this case, when the object-side surface of the positive lens LI1 closest to the object within the first lens group I is a convex surface, the curvature of the convex surface is within an appropriate range defined by the conditional expression (3).

If the parameter of the conditional expression (5) is equal to or less than 0.25, the refractive power of the object-side surface of the lens LI1 would excessively increase. This would likely cause excessively significant aberration at that convex surface of the lens LI1 and make it difficult to correct the aberration accordingly. The excessive increase in the refractive power of the object-side surface of the lens LI1 would also likely cause astigmatism at an intermediate image height, and cause inward coma aberration to remain.

If the parameter of the conditional expression (5) is equal to or greater than 0.55, the refractive power of the object-side surface of the lens LI1 would excessively decrease. This would more likely cause a shortage of the telephoto characteristics, and hamper a reduction in the lens total length. In such a state, an attempt to forcedly shorten the lens total length would likely cause outward coma aberration to remain, or cause astigmatism at the peripheral image height.

When the conditional expression (5) is satisfied, the object-side surface of the positive lens LI1 disposed closest to the object within the first lens group I is a convex surface. The air lens ALI of the first lens group I has a biconvex shape, and the object-side surface of the air lens ALI is a convex surface facing the object side (i.e., a concave surface faces the image side). The conditional expression (6) determines the relative relation between the radius of curvature of the convex surface closest to the object within the first lens group I and the radius of curvature of the convex object-side surface of the air lens ALI.

The object-side surface of the lens LI1 and the object-side surface of the air lens ALI appropriately exchange aberrations with each other to correct the aberration of the entirety of the lens system.

If the parameter of the conditional expression (6) is equal to or less than 0.8, spherical aberration would be likely over-corrected and inward coma aberration would likely occur.

If the parameter of the conditional expression (6) is equal to or greater than 1.6, spherical aberration would be likely under-corrected and outward coma aberration would likely occur.

The imaging lens IL according to at least one embodiment mainly has a substantially symmetrical power arrangement and also includes a positive lens LI1 disposed closest to the object to obtain the characteristics slightly close to the telephoto lens.

Further, the surface closest to the object within the first lens group I and the surface closest to the image within the second lens group II are both convex. This enables these two convex surfaces opposed to each other with the aperture stop S therebetween to have a substantially symmetrical power arrangement. Such a power arrangement achieves correction of coma aberration at an extremely high level.

The conditional expression (7) determines a desired range of the relative relation between the radius of curvature of the convex surface closest to the object in the imaging lens IL and the radius of curvature of the convex surface closest to the image in the imaging lens IL.

When the conditional expression (7) is satisfied by the relative relation between the radius of curvatures of the above-described two convex surfaces opposed to each other with the aperture stop S therebetween, coma aberration can be corrected at a high level.

The imaging lens IL according to at least one embodiment of the present disclosure desirably satisfies at least one of conditional expressions (8) to (10) below:

$$0.25 < f1/f2 < 5.0 \tag{8}$$

$$0.40 < Y'/f < 0.70 \tag{9}$$

$$0.50 < \tan(\theta P \text{ max}) < 0.85 \tag{10}$$

The reference signs used in parameters of the conditional expressions (8) to (10) are described as follows.

f1 denotes a focal length of the first lens group I;
f2 denotes a focal length of the second lens group II;
Y' denotes a maximum image height; and
θP max denotes an incident angle of the principal ray reaching the maximum image height with respect to the imaging plane Im.

Satisfying the conditional expression (8) by the parameter (f1/f2) of the conditional expression (8) keeps well-balanced refractive power in front and rear of the aperture stop S, and effectively reduces the distortion, coma aberration, and lateral chromatic aberration.

The range in which the parameter (Y'/f) of the conditional expression (9) satisfies the conditional expression (9) refers to a desired range of an angle of view of the imaging lens IL. The range in which the parameter tan(θP max) of the conditional expression (10) satisfies the conditional expression (10) refers to a desired range of the incident angle of the principal ray reaching the maximum image height with respect to the imaging plane Im, for the imaging lens IL.

It is desired that the lens surface closest to the image within the second lens group II is a convex surface, and the curvature r2R of the convex surface satisfy conditional expression (11) below:

$$-8.0 < r2R/f < -0.5 \tag{11}$$

The range in which the parameter (r2R/f) of the conditional expression (11) satisfies the conditional expression (11) is a desired range to have the above-described convex surface opposed to the object-side surface of the positive lens LI1 disposed closest to the object within the first lens group I and balance correction of various aberrations.

It is desired that the refractive index nd1P of material of the positive lens LI1 disposed closest to the object within the first lens group I satisfy conditional expression (12) below:

$$nd1P > 1.75 \tag{12}$$

If the refractive index nd1P of the material of the positive lens LI1 closest to the object within the first lens group I is equal to or less than 1.75, the curvature of field would be likely under-corrected, and astigmatism would likely remain.

Notably, the upper limit of the conditional expression (12) is in a range of from about 2.0 to about 2.1 with regard to the range of the refractive index and the cost of an existing optical glass.

Further, the biconvex air lens ALI of the first lens group I is disposed closest to the object among any air lenses within the first lens group I, and the biconvex air lens ALII of the second lens group II is disposed closest to the image among any air lenses within the second lens group II. Such an arrangement of the air lens ALI and the air lens ALII maximizes correction aberration effects of the air lenses ALI and ALII.

To correct aberration more successfully, it is desired that the first lens group I and the second lens group II have aspherical surfaces. The aspherical surface has a large advantageous effect on correction of astigmatism, coma aberration, and distortion.

The imaging lens IL according to at least one embodiment is used as an image-capturing optical system of a camera, such as a typical digital camera, an inspection camera, or an on-vehicle camera. Further, the imaging lens IL according to at least one embodiment is used as an image-capturing optical system in a camera functional unit of a mobile information terminal.

EXAMPLES

Ten numerical examples of the imaging lenses IL are specifically described below. In all the numerical examples, the maximum image height (Y') is 14.2 millimeters (mm). In all the examples, a parallel plate, which corresponds to a transparent parallel plate F in FIGS. 1 to 10, is disposed closer to an image than the second lens group II, and is assumed to be one of various kinds of filters, such as an optical low-pass filter and an infrared cut-off filter, and a cover glass (seal glass) for an image sensor, such as a CMOS sensor, as described above.

In all the examples, the parallel plate is disposed such that an image-side surface of the parallel plate is disposed at a position of about 0.7 mm from the imaging plane Im in FIGS. 1 to 10 in a direction to the object. However, the configuration is not limited thereby. The parallel plate may be a single plate and may be divided into a plurality of plates.

In the examples, the signs denote as follows:
f denotes a focal length of the whole system of the imaging lens IL;
FNO denotes a F-number;
ω denotes a half angle of view;
R denotes a radius of curvature;
D denotes a surface distance;
Nd denotes a refractive index;
vd denotes an Abbe number;
$P_{g,F}$ denotes a partial dispersion ratio;
K denotes a conic constant of an aspherical surface;
A4 denotes a fourth-order aspherical coefficient;
A6 is a sixth-order aspherical coefficient;
A8 is an eighth-order aspherical coefficient; and
A10 is a tenth-order aspherical coefficient The partial dispersion ratios $P_{g,F}$ are dimensionless quantity given by an equation below where ng is a refractive index with respect the g-line, $n_F$ is a refractive index with respect to the F-line, and $n_C$ is a refractive index with respect to the C-line:

$$P_{gF}=(n_g-n_F)/(n_F-n_C)$$

In each example, an aspherical surface is used. An aspherical surface X is indicated by the following known expression where C denotes the reciprocal of a paraxial curvature radius (i.e., paraxial curvature), H denotes a height from the optical axis $A_X$, K denotes a conic constant, and A4, A6, A8, and A10 denote the aspherical coefficients of the 4th, 6th, 8th, and 10th orders, respectively:

$$X=CH^2/\{1+\sqrt{(1-(1+K)C^2H^2)}\}+A4 \cdot H^4+A6 \cdot H^6+A8 \cdot H^8+A10 \cdot H^{10}$$

FIG. 1 is an illustration of a configuration of an imaging lens IL according to the first numerical example. As illustrated in FIG. 1, the first lens group I consists of three lenses of lenses LI1, LI2, and LI3, and the second lens group II consists of three lenses of lenses LII1, LII2, and LII3. The air lens ALI included in the first lens group I is formed by the lens LI1 and the lens LI2 and has a biconvex shape.

The air lens ALII included in the second lens group II is formed by the lens LII2 and the lens LII3 and has a biconvex shape.

When the whole system of the imaging lens IL in FIG. 1 is observed, the whole system includes four air lenses in total: the above-described air lenses ALI and ALII; an air lens formed by the lens LI2 and the lens LI3; and an air lens formed by the lens LI3 and the lens LII1. The air lenses except the air lenses ALI and ALII do not have negative refractive power.

The following describes the data of the first numerical example.

| f = 26.05, FNO. = 2.88, ω = 28.3 | | | | | | |
|---|---|---|---|---|---|---|
| Surface Number | R | D | Nd | vd | $P_{g,F}$ | Glass Type |
| 01* | 9.305 | 2.85 | 1.76450 | 49.10 | 0.5528 | OHARA L-LAH91 |
| 02* | 8.656 | 2.68 | | | | |
| 03 | −20.551 | 0.70 | 1.84666 | 23.78 | 0.6205 | OHARA S-TIH53W |
| 04 | 49.552 | 0.52 | | | | |
| 05 | 14.475 | 2.23 | 1.88300 | 40.76 | 0.5667 | OHARA S-LAH58 |
| 06 | −42.817 | 1.20 | | | | |
| 07 | ∞(STOP) | 1.20 | | | | |
| 08 | 24.522 | 2.44 | 1.88300 | 40.76 | 0.5667 | OHARA S-LAH58 |
| 09 | −10.254 | 0.60 | 1.62004 | 36.26 | 0.5879 | OHARA S-TIM2 |
| 10 | 31.858 | 1.08 | | | | |
| 11* | −20.768 | 1.00 | 1.88202 | 37.22 | 0.5769 | HOYA M-TAFD307 |
| 12* | −154.729 | 14.551 | | | | |
| 13 | ∞ | 1.40 | 1.51633 | 64.14 | | various kinds of filter |
| 14 | ∞ | | | | | |

The data for aspherical surfaces (the surfaces with the surface numbers marked with "*" in the above data. The same applies to the following second numerical example to tenth numerical example), and the data is indicated below.

The First Surface $K=0.0$, $A4=-1.79982\times10^{-5}$, $A6=-3.54440\times10^{-7}$, $A8=3.34427\times10^{-10}$, $A10=-3.90652\times10^{-10}$, The Second Surface $K=0.0$, $A4=5.44556\times10^{-5}$ The 11th Surface $K=0.0$, $A4=-5.23983\times10^{-4}$ The 12th Surface $K=0.0$, $A4=-2.57010\times10^{-4}$, $A6=4.61891\times10^{-6}$, $A8=-2.43254\times10^{-8}$, $A10=6.29252\times10^{-10}$ The parameter values of the conditional expressions listed above are as follows:

$(r1o+r1i)/(r1o-r1i)=-0.407$ (1)

$(r2o+r2i)/(r2o-r2i)=0.211$ (2)

$L/f=1.273$ (3)

$DT/f=0.633$ (4)

$r1F/f=0.357$ (5)

$r1F/r1O=1.075$ (6)

$r2s/r1s=-0.573$ (7)

$f1/f2=0.351$ (8)

$Y'/f=0.545$ (9)

$\tan(\theta P\ \max)=0.690$ (10)

$r2R/f=-5.940$ (11)

$nd1P=1.765$ (12)

Figure 2:
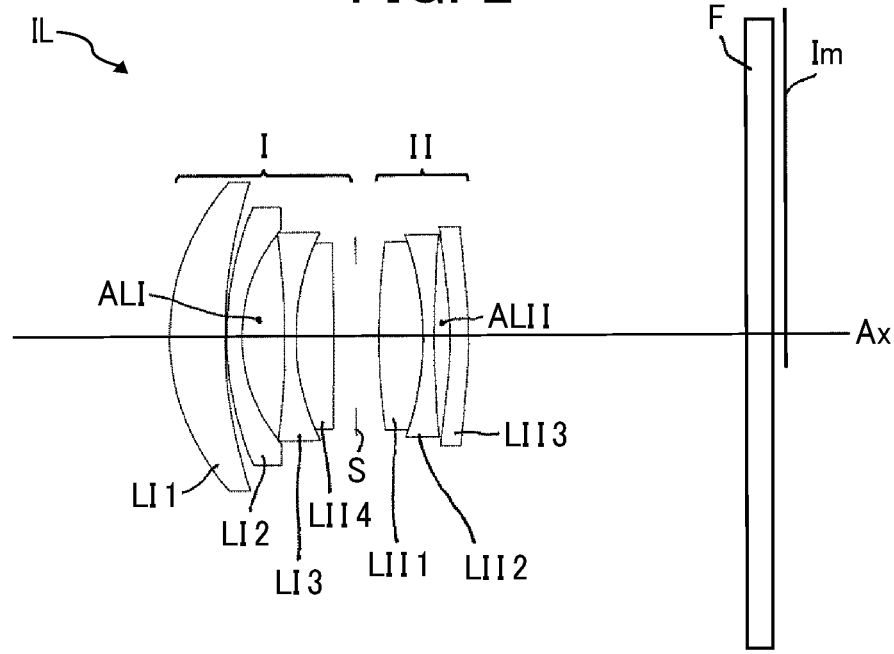
FIG. 2 is a cross-sectional view of a configuration of an imaging lens according to a second numerical example.

FIG. 2 is an illustration of the configuration of an imaging lens IL according to the second numerical example. As illustrated in FIG. 2, the first lens group I consists of four lenses of lenses LI1, LI2, LI3, and LI4, and the second lens group II consists of three lenses of lenses LII1, LII2, and LII3.

The air lens ALI included in the first lens group I is formed by the lens LI2 and the lens LI3 and has a biconvex shape. The air lens ALII included in the second lens group II is formed by the lens LII2 and the lens LII3 and has a biconvex shape.

When the whole system of the imaging lens IL in FIG. 2 is observed, the whole system includes four air lenses in total: the above-described air lenses ALI and ALII; an air lens formed by the lens LI1 and the lens LI2; and an air lens formed by the lens LI4 and the lens LII1. The air lenses except the air lenses ALI and ALII do not have negative refractive power.

The following describes the data of the second numerical example.

| f = 26.05, FNO. = 2.87, ω = 28.3 | | | | | | |
|---|---|---|---|---|---|---|
| Surface Number | R | D | Nd | vd | $P_{g,F}$ | Glass Type |
| 01* | 10.017 | 2.97 | 1.83220 | 40.10 | 0.5714 | OHARA L-LAH90 |
| 02 | 21.619 | 0.10 | | | | |
| 03 | 14.655 | 0.80 | 1.78470 | 26.29 | 0.6135 | OHARA S-TIH23 |
| 04 | 7.523 | 2.30 | | | | |
| 05 | −34.143 | 0.60 | 1.64769 | 33.79 | 0.5938 | OHARA S-TIM22 |
| 06 | 10.509 | 2.03 | 1.88300 | 40.76 | 0.5667 | OHARA S-LAH58 |
| 07 | −198.626 | 1.20 | | | | |
| 08 | ∞(STOP) | 1.21 | | | | |
| 09 | 31.757 | 2.26 | 1.88300 | 40.76 | 0.5667 | OHARA S-LAH58 |
| 10 | −13.329 | 0.60 | 1.62588 | 35.70 | 0.5893 | OHARA S-TIM1 |
| 11 | 48.214 | 0.84 | | | | |
| 12* | −18.000 | 1.00 | 1.90270 | 31.00 | 0.5943 | OHARA L-LAH86 |
| 13* | −20.113 | 14.890 | | | | |
| 14 | ∞ | 1.40 | 1.51633 | 64.14 | | various kinds of filter |
| 15 | ∞ | | | | | |

The data for the aspherical surfaces is indicated as follows.

The First Surface $K=0.0$, $A4=-3.54224\times10^{-5}$, $A6=-4.66804\times10^{-8}$, $A8=-1.10660\times10^{-8}$, $A10=8.24552\times10^{-11}$, $A12=-1.19318\times10^{-12}$ The 12th Surface $K=0.0$, $A4=3.45703\times10^{-4}$ The 13th Surface $K=0.0$, $A4=3.69614\times10^{-4}$, $A6=-4.24378\times10^{-7}$, $A8=5.77254\times10^{-8}$, $A10=-1.22381\times10^{-9}$ The parameter values of the conditional expressions listed above are as follows:

$(r1o+r1i)/(r1o-r1i)=-0.639$ (1)

$(r2o+r2i)/(r2o-r2i)=0.456$ (2)

$L/f=1.267$ (3)

$DT/f=0.614$ (4)

$r1F/f=0.384$ (5)

$r1F/r1O=1.332$ (6)

$r2s/r1s=-0.160$ (7)

$f1/f2=1.760$ (8)

$Y'/f=0.545$ (9)

$\tan(\theta P \max)=0.682$ (10)

$r2R/f=-0.772$ (11)

$nd1P=1.832$ (12)

Figure 3:
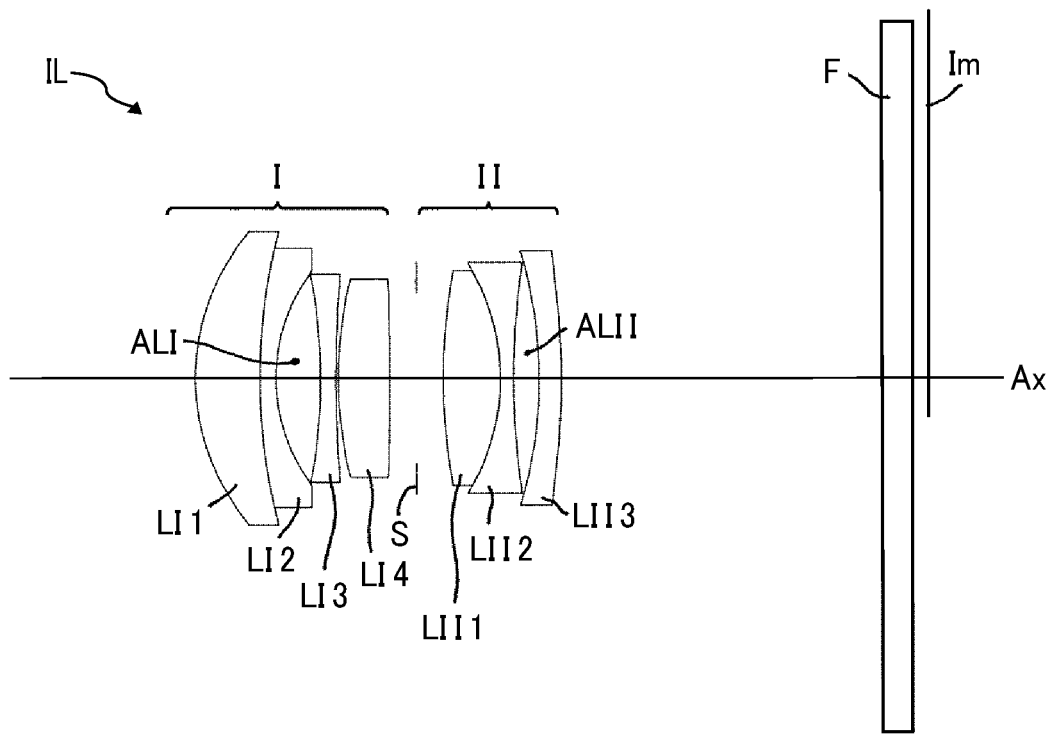
FIG. 3 is a cross-sectional view of a configuration of an imaging lens according to a third numerical example.

FIG. 3 is an illustration of the configuration of an imaging lens IL according to the third numerical example. As illustrated in FIG. 3, the first lens group I consists of four lenses of lenses LI1, LI2, LI3, and LI4, and the second lens group II consists of three lenses of lenses LII1, LII2, and LII3.

The air lens ALI included in the first lens group I is formed by the lens LI2 and the lens LI3 and has a biconvex shape. The air lens ALII included in the second lens group II is formed by the lens LII2 and the lens LII3 and has a biconvex shape. When the whole system of the imaging lens IL in FIG. 3 is observed, the whole system includes four air lenses in total: the above-described air lenses ALI and ALII; an air lens formed by the lens LI3 and the lens LI4; and an air lens formed by the lens LI4 and the lens LII1. The air lenses except the air lenses ALI and ALII do not have negative refractive power.

The lens LI1 and the lens LI2 of the first lens group I are cemented together to form a compound lens, and the lens LII1 and the lens LII2 of the second lens group II are also cemented together to form a compound lens.

The following describes the data of the third numerical example.

| f = 26.05, FNO. = 2.87, ω = 28.3 | | | | | | |
|---|---|---|---|---|---|---|
| Surface Number | R | D | Nd | vd | $P_{g,F}$ | Glass Type |
| 01* | 9.247 | 2.91 | 1.85400 | 40.38 | 0.5688 | OHARA L-LAH85V |
| 02 | 24.908 | 0.70 | 1.78880 | 28.43 | 0.6009 | OHARA S-NBH58 |
| 03 | 7.360 | 2.01 | | | | |
| 04 | −22.769 | 0.70 | 1.63980 | 34.47 | 0.5922 | OHARA S-TIM27 |
| 05 | 61.496 | 0.10 | | | | |
| 06 | 17.395 | 2.32 | 1.88300 | 40.76 | 0.5667 | OHARA S-LAH58 |
| 07 | −113.651 | 1.20 | | | | |
| 08 | ∞(STOP) | 1.20 | | | | |
| 09 | 24.522 | 2.57 | 1.75500 | 52.32 | 0.5667 | OHARA S-LAH58 |
| 10 | −9.139 | 0.60 | 1.53172 | 48.84 | 0.5631 | OHARA S-TIL6 |
| 11 | 33.044 | 1.15 | | | | |
| 12* | −18.000 | 1.00 | 1.90270 | 31.00 | 0.5943 | OHARA L-LAH86 |
| 13* | −26.676 | 14.378 | | | | |
| 14 | ∞ | 1.40 | 1.51633 | 64.14 | | various kinds of filter |
| 15 | ∞ | | | | | |

The data for the aspherical surfaces is indicated as follows.

The First Surface $K=0.0$, $A4=-2.63557\times10^{-5}$, $A6=-6.86204\times10^{-7}$, $A8=9.51319\times10^{-9}$, $A10=-2.99238\times10^{-10}$ The 13th Surface $K=0.0$, $A4=1.30975\times10^{-4}$, $A6=-3.75252\times10^{-7}$,
$A8=5.96446\times10^{-8}$, $A10=-8.12812\times10^{-10}$ The parameter values of the conditional expressions listed above are as follows:

$(r1o+r1i)/(r1o-r1i)=-0.511$ (1)

$(r2o+r2i)/(r2o-r2i)=0.295$ (2)

$L/f=1.264$ (3)

$DT/f=0.632$ (4)

$r1F/f=0.355$ (5)

$r1F/r1O=1.256$ (6)

$r2s/r1s=-0.216$ (7)

$f1/f2=1.296$ (8)

$Y'/f=0.545$ (9)

$\tan(\theta P\ \max)=0.672$ (10)

$r2R/f=-1.024$ (11)

$nd1P=1.854$ (12)

Figure 4:
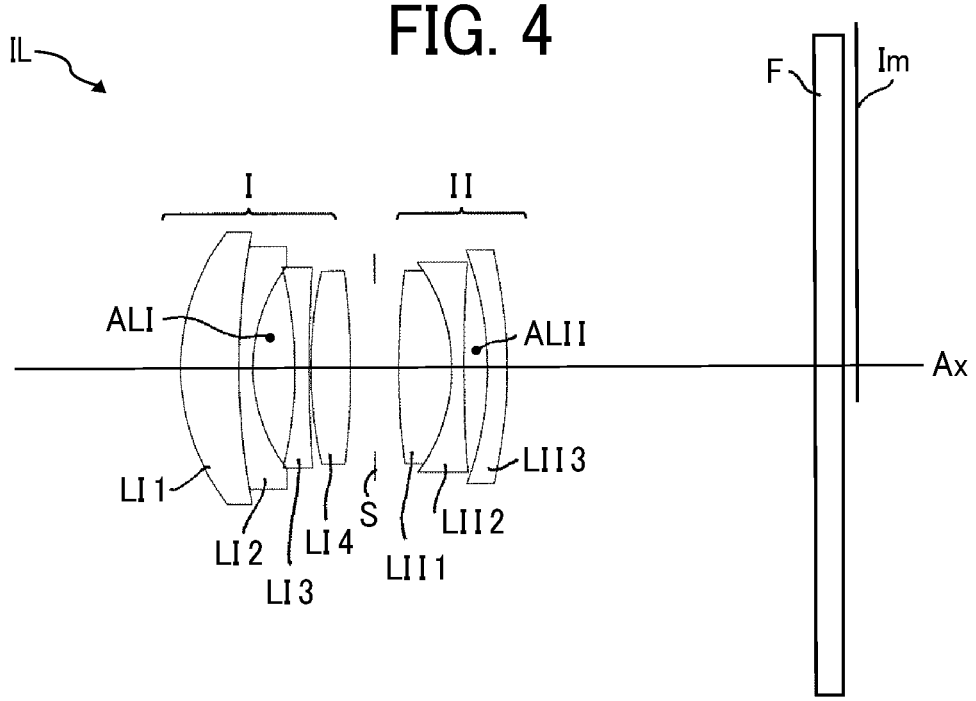
FIG. 4 is a cross-sectional view of a configuration of an imaging lens according to a fourth numerical example.

FIG. 4 is an illustration of the configuration of an imaging lens IL according to the fourth numerical example. As illustrated in FIG. 4, the first lens group I consists of four lenses of lenses LI1, LI2, LI3, LI4, and the second lens group II consists of three lenses of lenses LII1, LII2, and LII3.

The air lens ALI included in the first lens group I is formed by the lens LI2 and the lens LI3 and has a biconvex shape.

The air lens ALII included in the second lens group II is formed by the lens LII2 and the lens LII3 and has a biconvex shape.

When the whole system of the imaging lens IL in FIG. 4 is observed, the whole system includes four air lenses in total: the above-described air lenses ALI and ALII; an air lens formed by the lens LI3 and the lens LI4; and an air lens formed by the lens LI4 and the lens LII1. The air lenses except the air lenses ALI and ALII do not have negative refractive power.

The lens LI1 and the lens LI2 of the first lens group I are cemented together to form a compound lens, and the lens LII1 and the lens LII2 of the second lens group II are also cemented together to form a compound lens.

The following describes the data of the fourth numerical example.

| Surface Number | R | D | Nd | vd | $P_{g,F}$ | Glass Type |
|---|---|---|---|---|---|---|
| 01* | 9.447 | 2.95 | 1.85400 | 40.38 | 0.5688 | OHARA L-LAH85V |
| 02 | 30.602 | 0.70 | 1.74077 | 27.79 | 0.6095 | OHARA S-TIH13 |
| 03 | 7.393 | 2.11 | 1.60342 | 38.03 | 0.5922 | OHARA S-TIM5 |
| 04 | -18.010 | 0.70 | | | | |
| 05 | 56.812 | 0.10 | | | | |
| 06 | 18.661 | 2.01 | 1.83481 | 42.74 | 0.5648 | OHARA S-LAH55VS |
| 07 | -35.218 | 1.22 | | | | |
| 08 | ∞(STOP) | 1.20 | | | | |
| 09 | 34.107 | 2.70 | 1.65160 | 58.55 | 0.5425 | OHARA S-LAL7 |
| 10 | -7.705 | 0.60 | 1.51823 | 58.90 | 0.5457 | OHARA S-NSL3 |
| 11 | 59.118 | 1.19 | | | | |
| 12 | -14.554 | 1.00 | 1.90270 | 31.00 | 0.5943 | OHARA L-LAH86 |
| 13* | -19.650 | 15.508 | | | | |
| 14 | ∞ | 1.40 | 1.51633 | 64.14 | | various kinds of filter |
| 15 | ∞ | | | | | | f = 28.00, FNO. = 2.88, ω = 26.6

The data for the aspherical surfaces is indicated as follows.

The First Surface $K=0.0$, $A4=-2.52197\times10^{-5}$, $A6=-7.06205\times10^{-7}$,
$A8=1.01999\times10^{-8}$, $A10=-2.76954\times10^{-10}$ The 13th Surface $K=0.0$, $A4=9.97548\times10^{-5}$, $A6=-2.74503\times10^{-7}$,
$A8=4.05280\times10^{-8}$, $A10=-4.40120\times10^{-10}$ The parameter values of the conditional expressions listed above are as follows:

$(r1o+r1i)/(r1o-r1i)=-0.418$ (1)

$(r2o+r2i)/(r2o-r2i)=0.605$ (2)

$L/f=1.217$ (3)

$DT/f=0.589$ (4)

$r1F/f=0.337$ (5)

$r1F/r1O=1.278$ (6)

$r2s/r1s=-0.968$ (7)

$f1/f2=0.530$ (8)

$Y'/f=0.507$ (9)

$\tan(\theta P\ \max)=0.629$ (10)

$r2R/f=-0.702$ (11)

$nd1P=1.854$ (12)

Figure 5:
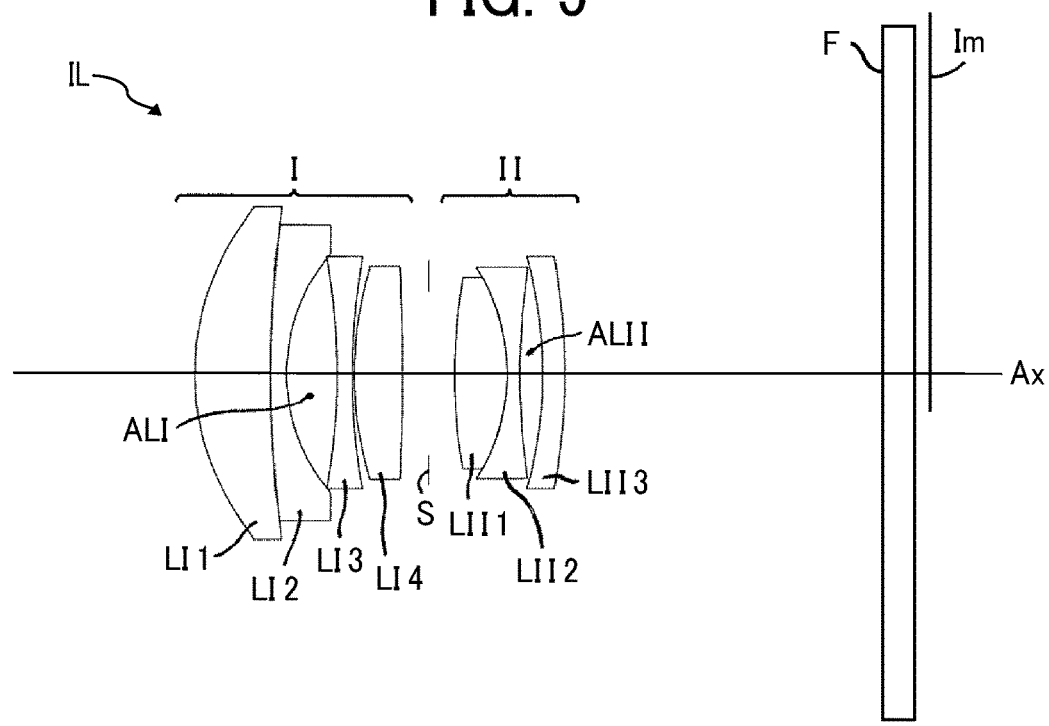
FIG. 5 is a cross-sectional view of a configuration of an imaging lens according to a fifth numerical example.

FIG. 5 is an illustration of the configuration of an imaging lens IL according to the fifth numerical example. As illustrated in FIG. 5, the first lens group I consists of four lenses of lenses LI1, LI2, LI3, LI4, and the second lens group II consists of three lenses of lenses LII1, LII2, and LII3.

The air lens ALI included in the first lens group I is formed by the lens LI2 and the lens LI3 and has a biconvex shape. The air lens ALII included in the second lens group II is formed by the lens LII2 and the lens LII3 and has a biconvex shape.

When the whole system of the imaging lens IL in FIG. 5 is observed, the whole system includes four air lenses in total: the above-described air lenses ALI and ALII; an air lens formed by the lens LI3 and the lens LI4; and an air lens formed by the lens LI4 and the lens LII1. The air lenses except the air lenses ALI and ALII do not have negative refractive power.

The lens LI1 and the lens LI2 of the first lens group I are cemented together to form a compound lens, and the lens LII1 and the lens LII2 of the second lens group II are also cemented together to form a compound lens.

The following describes the data of the fifth numerical example.

| f = 26.05, FNO. = 2.88, ω = 28.3 | | | | | | |
|---|---|---|---|---|---|---|
| Surface Number | R | D | Nd | vd | $P_{g,F}$ | Glass Type |
| 01* | 10.626 | 3.50 | 1.85400 | 40.38 | 0.5688 | OHARA L-LAH85V |
| 02 | 55.319 | 0.70 | 1.72825 | 28.46 | 0.6077 | OHARA S-TIH10 |
| 03 | 7.914 | 2.33 | | | | |
| 04 | −28.150 | 0.70 | 1.64769 | 33.79 | 0.5938 | OHARA S-TIM22 |
| 05 | 28.150 | 0.10 | | | | |
| 06 | 16.113 | 2.22 | 1.90525 | 35.04 | 0.5848 | OHARA S-LAH93 |
| 07 | −94.335 | 1.20 | | | | |
| 08 | ∞(STOP) | 1.20 | | | | |
| 09 | 25.481 | 2.42 | 1.72916 | 54.09 | 0.5448 | OHARA S-LAL19 |
| 10 | −8.325 | 0.60 | 1.54814 | 45.78 | 0.6030 | OHARA S-TIM35 |
| 11 | 31.988 | 1.04 | | | | |
| 12 | −18.000 | 1.00 | 1.90270 | 31.00 | 0.5943 | OHARA L-LAH86 |
| 13* | −22.450 | 14.638 | | | | |
| 14 | ∞ | 1.40 | 1.51633 | 64.14 | | various kinds of filter |
| 15 | ∞ | | | | | |

The data for the aspherical surfaces is indicated as follows.

The First Surface $K=0.0, A4=-2.62422\times10^{-5}, A6=-4.81459\times10^{-7},$
$A8=3.20423\times10^{-9}, A10=-1.16410\times10^{-10}$ The 13th Surface $K=0.0, A4=1.22749\times10^{-4}, A6=-2.98756\times10^{-7},$
$A8=6.89210\times10^{-8}, A10=-9.94935\times10^{-10}$ The parameter values of the conditional expressions listed above are as follows:

$(r1o+r1i)/(r1o-r1i)=-0.561$ (1)

$(r2o+r2i)/(r2o-r2i)=0.280$ (2)

$L/f=1.295$ (3)

$DT/f=0.653$ (4)

$r1F/f=0.408$ (5)

$r1F/r1O=1.343$ (6)

$r2s/r1s=-0.270$ (7)

$f1/f2=1.252$ (8)

$Y'/f=0.545$ (9)

$\tan(\theta P \max)=0.688$ (10)

$r2R/f=-0.862$ (11)

$nd1P=1.854$ (12)

Figure 6:
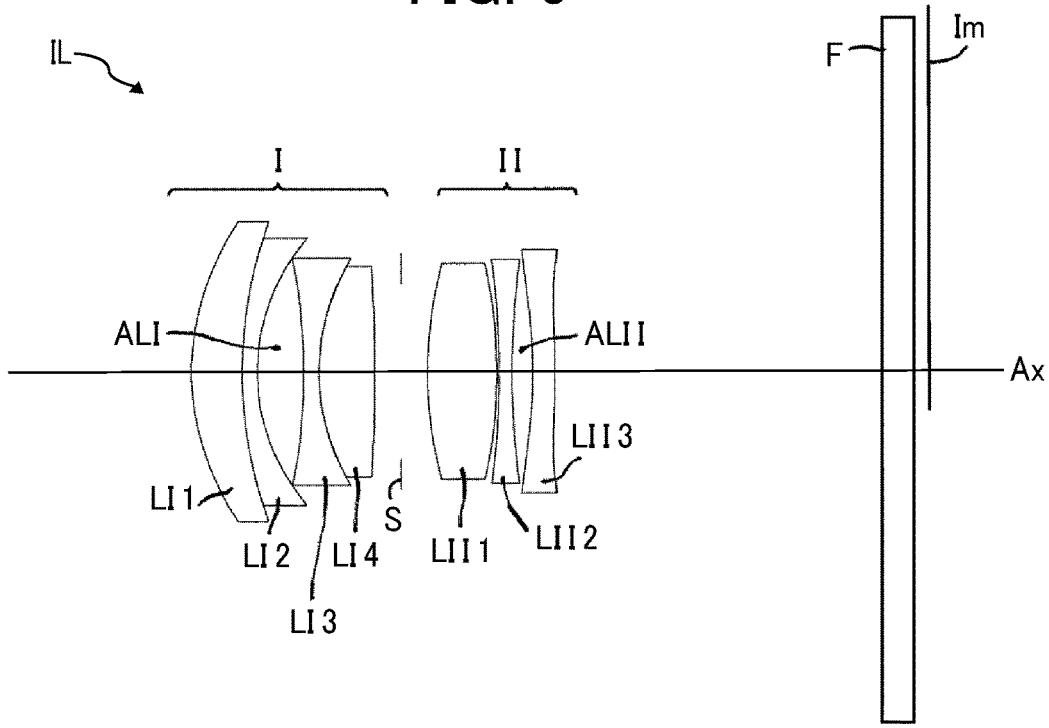
FIG. 6 is a cross-sectional view of a configuration of an imaging lens according to a sixth numerical example.

FIG. 6 is an illustration of the configuration of an imaging lens IL according to the sixth numerical example. As illustrated in FIG. 6, the first lens group I consists of four lenses of lenses LI1, LI2, LI3, LI4, and the second lens group II consists of three lenses of lenses LII1, LII2, and LII3.

The air lens ALI included in the first lens group I is formed by the lens LI2 and the lens LI3 and has a biconvex shape.

The air lens ALII included in the second lens group II is formed by the lens LII2 and the lens LII3 and has a biconvex shape.

When the whole system of the imaging lens IL in FIG. 6 is observed, the whole system includes four air lenses in total: the above-described air lenses ALI and ALII; an air lens formed by the lens LI4 and the lens LII1; and an air lens formed by the lens LII1 and the lens LII2. The air lenses except the air lenses ALI and ALII do not have negative refractive power.

The lens LI1 and the lens LI2 of the first lens group I are cemented together to form a compound lens, and the lens LI3 and the lens LI4 of the first lens group I are also cemented together to form a compound lens.

The following describes the data of the sixth numerical example.

| f = 24.68, FNO. = 2.88, ω = 29.6 | | | | | | |
|---|---|---|---|---|---|---|
| Surface Number | R | D | Nd | vd | $P_{g,F}$ | Glass Type |
| 01* | 10.669 | 2.30 | 1.82080 | 42.71 | 0.5642 | HOYA M-TAFD51 |
| 02 | 18.250 | 0.70 | 1.67300 | 38.15 | 0.5757 | OHARA S-NBH52V |
| 03 | 8.706 | 2.08 | | | | |
| 04 | −24.184 | 0.70 | 1.67270 | 32.10 | 0.5988 | OHARA S-TIM25 |
| 05 | 9.234 | 2.54 | 1.88300 | 40.69 | 0.5673 | HIKARI J-LASF08A |
| 06 | −65.279 | 1.20 | | | | |
| 07 | ∞(STOP) | 1.20 | | | | |
| 08 | 18.050 | 3.15 | 1.88300 | 40.69 | 0.5673 | HIKARI J-LASF08A |
| 09 | −20.928 | 0.10 | | | | |
| 10 | −35.679 | 0.60 | 1.68893 | 31.07 | 0.6004 | OHARA S-TIM28 |
| 11 | 35.679 | 0.94 | | | | |
| 12* | −17.345 | 1.00 | 1.68893 | 31.16 | 0.6037 | HOYA M-FD80 |
| 13* | −37.142 | 14.893 | | | | |
| 14 | ∞ | 1.40 | 1.51633 | 64.14 | | various kinds of filter |
| 15 | ∞ | | | | | |

The data for the aspherical surfaces is indicated as follows.

The First Surface $K=0.0, A4=-3.29990\times10^{-5}, A6=-6.63571E\times10^{-7},$
$A8=3.34066\times10^{-9}, A10=-2.16938\times10^{-10}$ The 12th Surface $K=0.0, A4=6.59150\times10^{-4}, A6=-9.07297\times10^{-6}$ The 13th Surface $K=0.0, A4=8.07148\times10^{-4}, A6=-7.24676\times10^{-6}, A8=-1.28617\times10^{-9}, A10=1.09784\times10^{-10}$ The parameter values of the conditional expressions listed above are as follows:

$(r1o+r1i)/(r1o-r1i)=-0.471$ (1)

$(r2o+r2i)/(r2o-r2i)=0.346$        (2)

$L/f=1.358$        (3)

$DT/f=0.669$        (4)

$r1F/f=0.432$        (5)

$r1F/r1O=1.225$        (6)

$r2s/r1s=-0.277$        (7)

$f1/f2=3.573$        (8)

$Y'/f=0.575$        (9)

$\tan(\theta P \max)=0.685$        (10)

$r2R/f=-1.505$        (11)

$nd1P=1.821$        (12)

Figure 7:
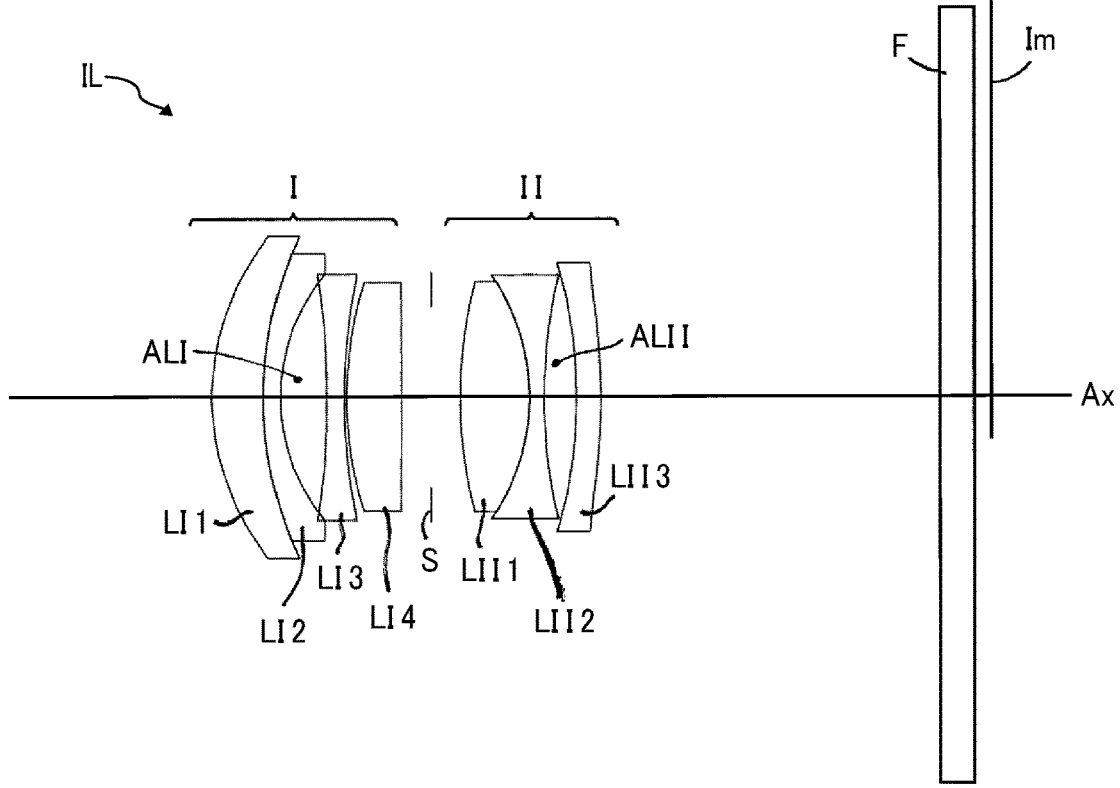
FIG. 7 is a cross-sectional view of a configuration of an imaging lens according to a seventh numerical example.

FIG. 7 is an illustration of the configuration of an imaging lens IL according to the seventh numerical example. As illustrated in FIG. 7, the first lens group I consists of four lenses of lenses LI1, LI2, LI3, LI4, and the second lens group II consists of three lenses of lenses LII1, LII2, and LII3.

The air ALI included in the first lens group I is formed by the lens LI2 and the lens LI3 and has a biconvex shape.

The air lens ALII included in the second lens group II is formed by the lens LII2 and the lens LII3 and has a biconvex shape.

When the whole system of the imaging lens IL in FIG. 7 is observed, the whole system includes four air lenses in total: the above-described air lenses ALI and ALII; an air lens formed by the lens LI3 and the lens LI4; and an air lens formed by the lens LI4 and the lens LII1. The air lenses except the air lenses ALI and ALII do not have negative refractive power.

The lens LI1 and the lens LI2 of the first lens group I are cemented together to form a compound lens, and the lens LII1 and the lens LII2 of the second lens group II are also cemented together to form a compound lens.

The following describes the data of the seventh numerical example.

| | | f = 23.42, FNO. = 2.88, ω = 30.9 | | | | |
|---|---|---|---|---|---|---|
| Surface Number | R | D | Nd | vd | $P_{g,F}$ | Glass Type |
| 01* | 9.393 | 2.12 | 1.82080 | 42.71 | 0.5642 | HOYA M-TAFD51 |
| 02 | 14.350 | 0.70 | 1.69895 | 30.05 | 0.6028 | HOYA E-FD15 |
| 03 | 7.440 | 1.92 | | | | |
| 04 | −29.751 | 0.70 | 1.64769 | 33.84 | 0.5923 | HOYA E-FD2 |
| 05 | 22.787 | 0.10 | | | | |
| 06 | 14.677 | 2.29 | 1.88300 | 40.69 | 0.5673 | HIKARI J-LASF08A |
| 07 | −191.434 | 1.20 | | | | |
| 08 | ∞ (STOP) | 1.20 | | | | |
| 09 | 17.856 | 2.86 | 1.88100 | 40.14 | 0.5701 | HOYA TAFD33 |
| 10 | −8.223 | 0.60 | 1.67270 | 32.17 | 0.5962 | HOYA E-FD5 |
| 11 | 21.102 | 1.30 | | | | |
| 12 | −18.000 | 1.00 | 1.88202 | 37.22 | 0.5769 | HOYA M-TAFD307 |

-continued

| | | f = 23.42, FNO. = 2.88, ω = 30.9 | | | | |
|---|---|---|---|---|---|---|
| Surface Number | R | D | Nd | vd | $P_{g,F}$ | Glass Type |
| 13* | −22.111 | 13.940 | | | | |
| 14 | ∞ | 1.40 | 1.51633 | 64.14 | | various kinds of filter |
| 15 | ∞ | | | | | |

The data for the aspherical surfaces is indicated as follows.

The First Surface $K=0.0, A4=-4.08710\times10^{-5}, A6=-4.27926\times10^{-7},$
$A8=-1.04734\times10^{-8}, A10=-1.48266\times10^{-10}$ The 13th Surface $K=0.0, A4=1.88752\times10^{-4}, A6=9.04904\times10^{-7},$
$A8=8.62046\times10^{-8}, A10=-1.22399\times10^{-9}$ The parameter values of the conditional expressions listed above are as follows:

$(r1o+r1i)/(r1o-r1i)=-0.600$        (1)

$(r2o+r2i)/(r2o-r2i)=0.079$        (2)

$L/f=1.368$        (3)

$DT/f=0.683$        (4)

$r1F/f=0.401$        (5)

$r1F/r1O=1.263$        (6)

$r2s/r1s=-0.093$        (7)

$f1/f2=3.114$        (8)

$Y'/f=0.606$        (9)

$\tan(\theta P \max)=0.703$        (10)

$r2R/f=-0.944$        (11)

$nd1P=1.821$        (12)

Figure 8:
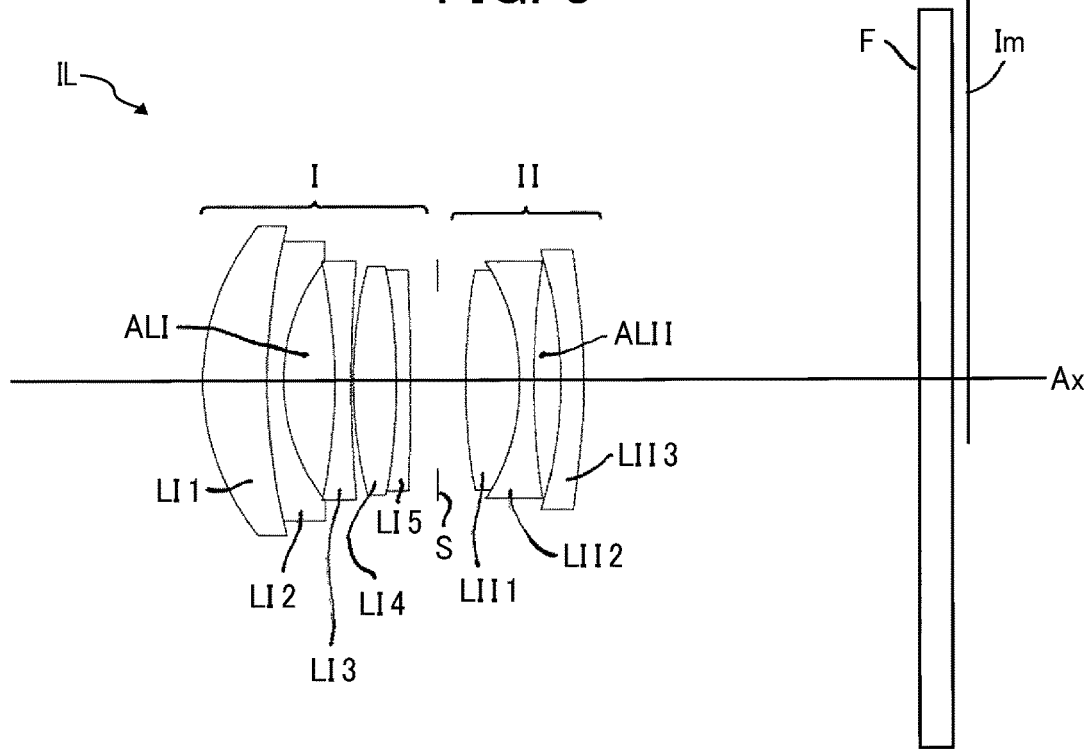
FIG. 8 is a cross-sectional view of a configuration of an imaging lens according to an eighth numerical example.

FIG. 8 is an illustration of the configuration of an imaging lens IL according to the eighth numerical example. As illustrated in FIG. 8, the first lens group I consists of five lenses of lenses LI1, LI2, LI3, LI4, and LI5, and the second lens group II consists of three lenses of lenses LII1, LII2, and LII3.

The air lens ALI included in the first lens group I is formed by the lens LI2 and the lens LI3 and has a biconvex shape.

The air lens ALII included in the second lens group II is formed by the lens LII2 and the lens LII3 and has a biconvex shape.

When the whole system of the imaging lens IL in FIG. 8 is observed, the whole system includes four air lenses in total: the above-described air lenses ALI and ALII; an air lens formed by the lens LI3 and the lens LI4; and an air lens formed by the lens LI5 and the lens LII1. The air lenses except the air lenses ALI and ALII do not have negative refractive power.

The lens LI1 and the lens LI2 of the first lens group I are cemented together to form a compound lens, and the lens LI4 and the lens LI5 of the first lens group I are also cemented together to form a compound lens. Further, the lens LII1 and the lens LII2 of the second lens group II are also cemented together to form a compound lens.

The following describes the data of the eighth numerical example.

| f = 26.04, FNO. = 2.88, ω = 28.3 | | | | | | |
|---|---|---|---|---|---|---|
| Surface Number | R | D | Nd | vd | $P_{g,F}$ | Glass Type |
| 01* | 9.572 | 2.78 | 1.85400 | 40.38 | 0.5688 | OHARA L-LAH85V |
| 02 | 24.829 | 0.70 | 1.78880 | 28.43 | 0.6009 | OHARA S-NBH58 |
| 03 | 7.822 | 2.23 | | | | |
| 04 | −22.140 | 0.70 | 1.56732 | 42.82 | 0.5731 | OHARA S-TIL26 |
| 05 | 53.236 | 0.10 | | | | |
| 06 | 18.531 | 1.89 | 1.88300 | 40.76 | 0.5667 | OHARA S-LAH58 |
| 07 | −24.000 | 0.60 | 1.80000 | 29.84 | 0.6017 | OHARA S-NBH55 |
| 08 | −116.418 | 1.20 | | | | |
| 09 | ∞ (STOP) | 1.20 | | | | |
| 10 | 12.474 | 2.36 | 1.74100 | 52.64 | 0.5467 | OHARA S-LAL61 |
| 11 | −8.112 | 0.60 | 1.54072 | 47.23 | 0.5651 | OHARA S-TIL2 |
| 12 | 11.685 | 1.14 | | | | |
| 13 | −17.538 | 1.00 | 1.86100 | 37.10 | 0.5785 | OHARA L-LAH94 |
| 14* | −19.900 | 14.581 | | | | |
| 15 | ∞ | 1.40 | 1.51633 | 64.14 | | various kinds of filter |
| 16 | ∞ | | | | | |

The data for the aspherical surfaces is indicated as follows.

The First Surface $K=0.0, A4=-2.62065\times10^{-5}, A6=-5.73136\times10^{-7}, A8=5.83843\times10^{-9}, A10=-2.15266\times10^{-10}$ The 14th Surface $K=0.0, A4=1.29178\times10^{-4}, A6=-4.772\ 36\times10^{-7}, A8=6.42635\times10^{-8}, A10=-9.22759\times10^{-10}$ The parameter values of the conditional expressions listed above are as follows:

$(r1o+r1i)/(r1o-r1i)=-0.478$ (1)

$(r2o+r2i)/(r2o-r2i)=0.284$ (2)

$L/f=1.274$ (3)

$DT/f=0.634$ (4)

$r1F/f=0.368$ (5)

$r1F/r1O=1.224$ (6)

$r2s/r1s=-0.224$ (7)

$f1/f2=1.023$ (8)

$Y'/f=0.545$ (9)

$\tan(\theta P\ max)=0.665$ (10)

$r2R/f=-0.975$ (11)

$nd1P=1.854$ (12)

Figure 9:
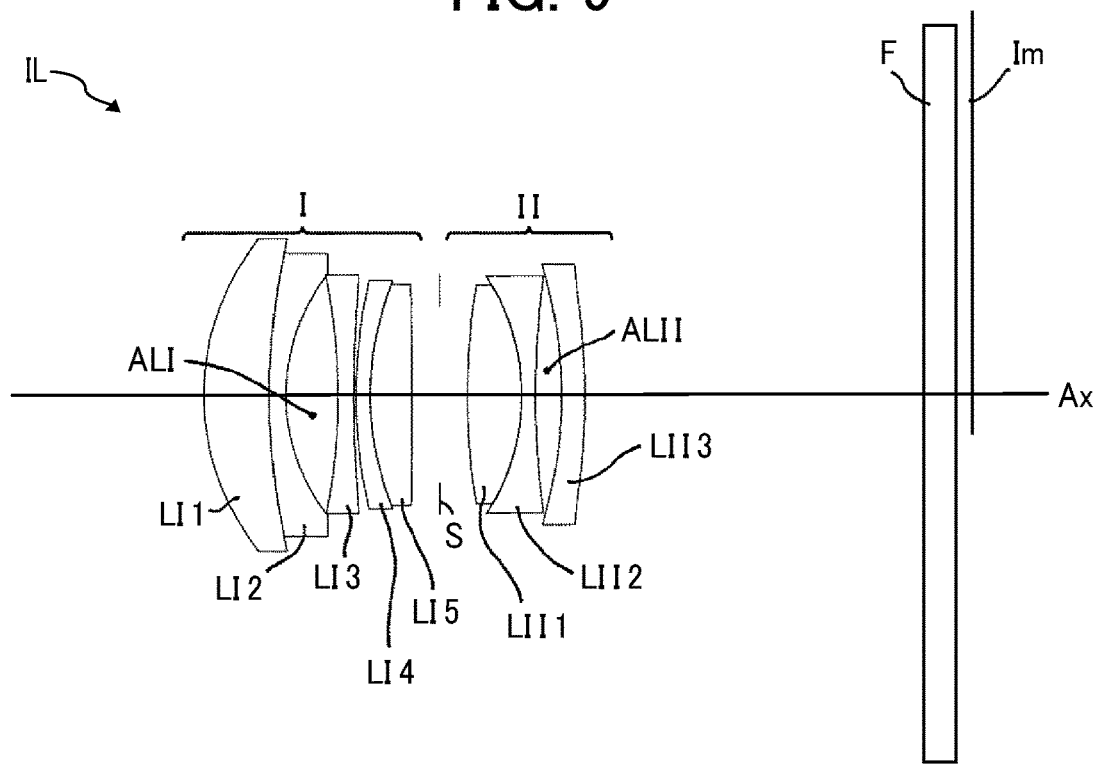
FIG. 9 is a cross-sectional view of a configuration of an imaging lens according to a ninth numerical example.

FIG. 9 is an illustration of the configuration of an imaging lens IL according to the ninth numerical example. As illustrated in FIG. 9, the first lens group I consists of five lenses of the lenses LI1, LI2, LI3, LI4, and LI5, and the second lens group II consists of three lenses of the lenses LII1, LII2, and LII3.

The air lens ALI included in the first lens group I is formed by the lens LI2 and the lens LI3 and has a biconvex shape.

The air lens ALII included in the second lens group II is formed by the lens LII2 and the lens LII3 and has a biconvex shape.

When the whole system of the imaging lens IL in FIG. 9 is observed, the whole system includes four air lenses in total: the above-described air lenses ALI and ALII; an air lens formed by the lens LI3 and the lens LI4; and an air lens formed by the lens LI5 and the lens LII1. The air lenses except the air lenses ALI and ALII do not have negative refractive power.

The lens LI1 and the lens LI2 of the first lens group I are cemented together to form a compound lens, and the lens LI4 and the lens LI5 of the first lens group I are also cemented together to form a compound lens. Further, the lens LII1 and the lens LII2 of the second lens group II are also cemented together to form a compound lens.

The following describes the data of the ninth numerical example.

| f = 26.06, FNO. = 2.88, ω = 28.3 | | | | | | |
|---|---|---|---|---|---|---|
| Surface Number | R | D | Nd | vd | $P_{g,F}$ | Glass Type |
| 01* | 9.718 | 2.85 | 1.85400 | 40.38 | 0.5688 | OHARA L-LAH85V |
| 02 | 28.191 | 0.70 | 1.78880 | 28.43 | 0.6009 | OHARA S-NBH58 |
| 03 | 7.936 | 2.26 | | | | |
| 04 | −23.765 | 0.70 | 1.56732 | 42.82 | 0.5731 | OHARA S-TIL26 |
| 05 | 55.698 | 0.10 | | | | |
| 06 | 20.822 | 0.60 | 1.68893 | 31.07 | 0.6004 | OHARA S-TIM28 |
| 07 | 11.777 | 1.83 | 1.88300 | 40.76 | 0.5667 | OHARA S-LAH58 |
| 08 | −139.566 | 1.20 | | | | |
| 09 | ∞ (STOP) | 1.20 | | | | |
| 10 | 27.121 | 2.36 | 1.73400 | 51.47 | 0.5486 | OHARA S-LAL59 |
| 11 | −8.707 | 0.60 | 1.54814 | 45.78 | 0.5686 | OHARA S-TIL1 |
| 12 | 36.884 | 1.10 | | | | |
| 13 | −18.000 | 1.00 | 1.86100 | 37.10 | 0.5785 | OHARA L-LAH94 |
| 14* | −25.049 | 14.581 | | | | |
| 15 | ∞ | 1.40 | 1.51633 | 64.14 | | various kinds of filter |
| 16 | ∞ | | | | | |

The data for the aspherical surfaces is indicated as follows.

The First Surface $K=0.0, A4=-2.46254\times10^{-5}, A6=-5.56469\times10^{-7}, A8=5.71488\times10^{-9}, A10=-1.90619\times10^{-10}$ The 14th Surface $K=0.0, A4=1.30813\times10^{-4}, A6=-3.50965\times10^{-7}, A8=5.51796\times10^{-8}, A10=-7.69857\times10^{-10}$ The parameter values of the conditional expressions listed above are as follows:

$(r1o+r1i)/(r1o-r1i)=-0.499$ (1)

$(r2o+r2i)/(r2o-r2i)=0.344$ (2)

$L/f=1.276$ (3)

$DT/f=0.633$ (4)

$r1F/f=0.373$ (5)

$r1F/r1O=1.225$ (6)

$r2s/r1s=-0.194$ (7)

$f1/f2=0.998$ (8)

$Y'/f=0.545$ (9)

$\tan(\theta P \max)=0.663$ (10)

$r2R/f=-0.961$ (11)

$nd1P=1.854$ (12)

Figure 10:
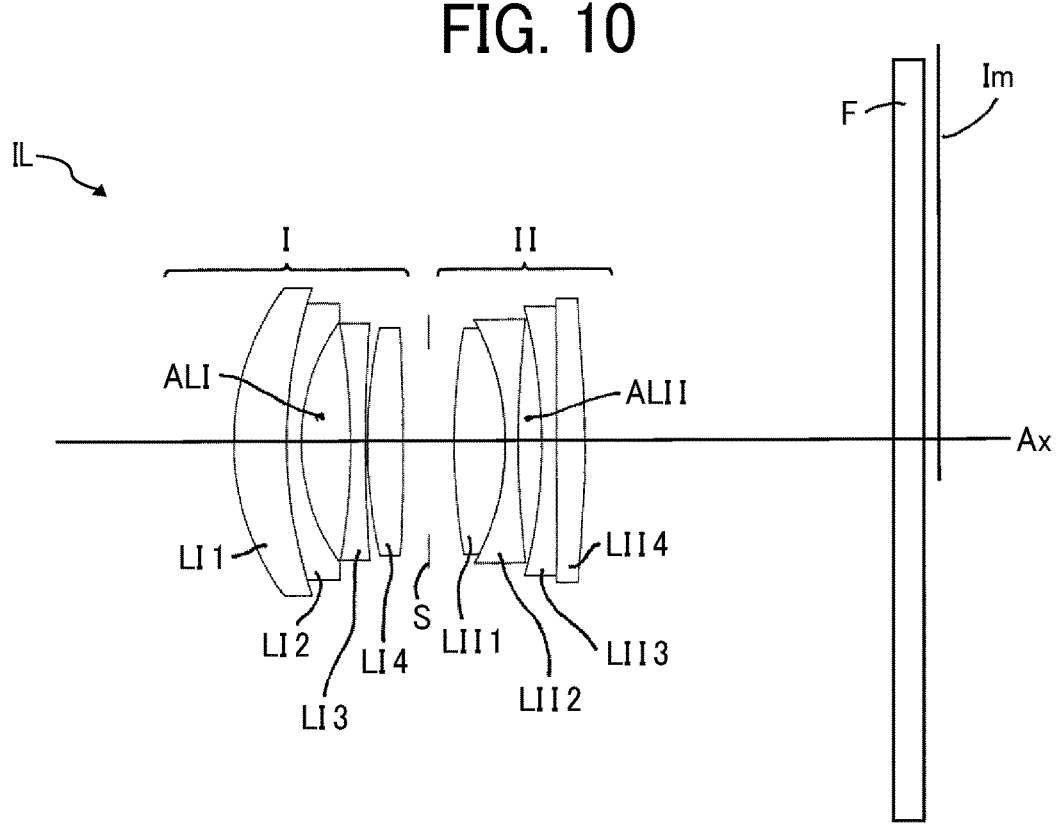
FIG. 10 is a cross-sectional view of a configuration of an imaging lens according to a tenth
Figure 11:
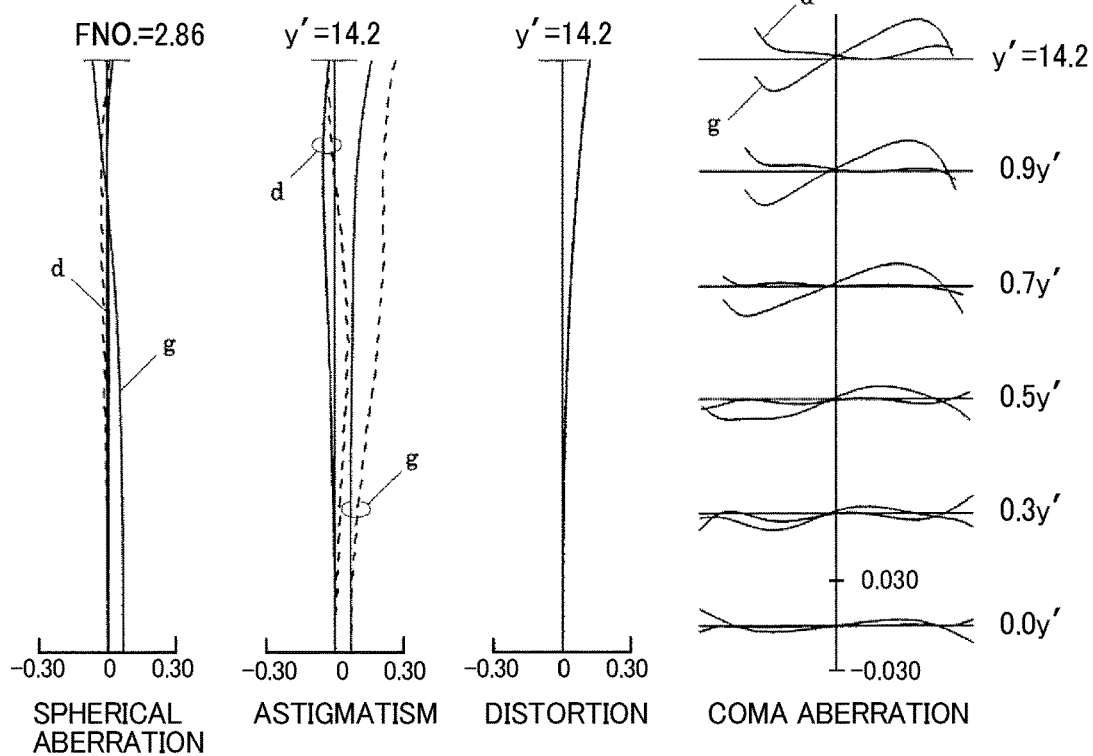
FIG. 11 is a collection of aberration curve diagrams of the imaging lens according to the first numerical example.
Figure 12:
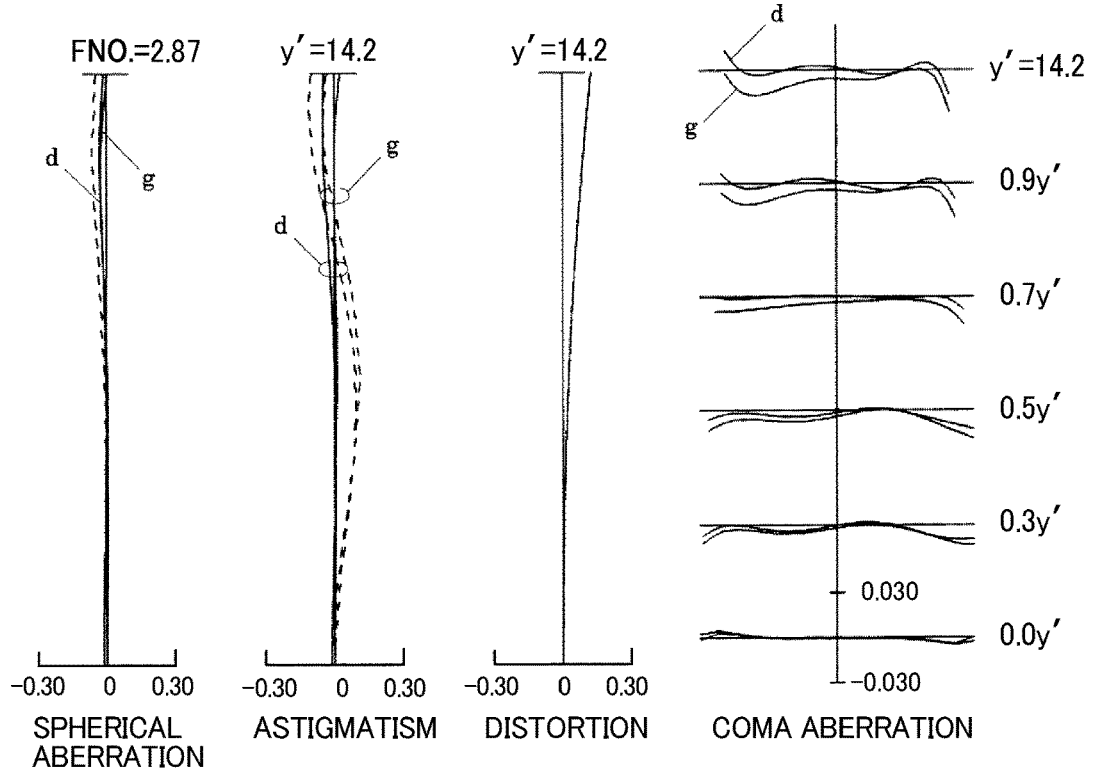
FIG. 12 is a collection of aberration curve diagrams of the imaging lens according to the second numerical example.
Figure 13:
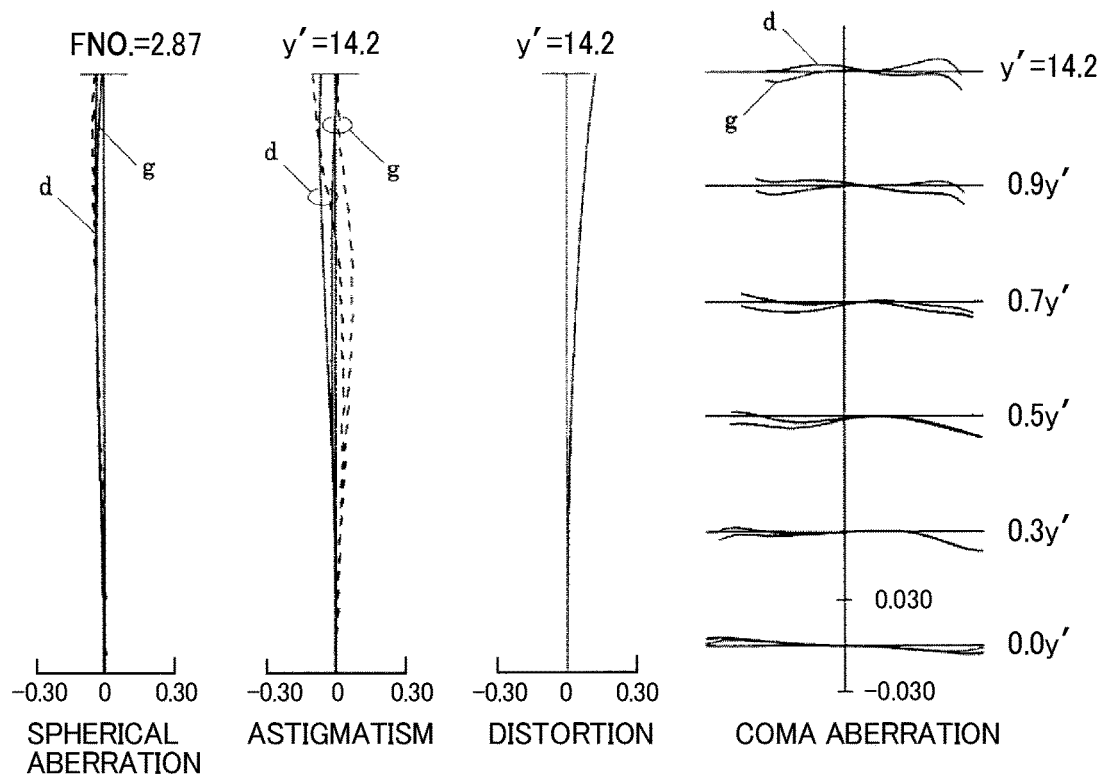
FIG. 13 is a collection of aberration curve diagrams of the imaging lens according to the third numerical example.
Figure 14:
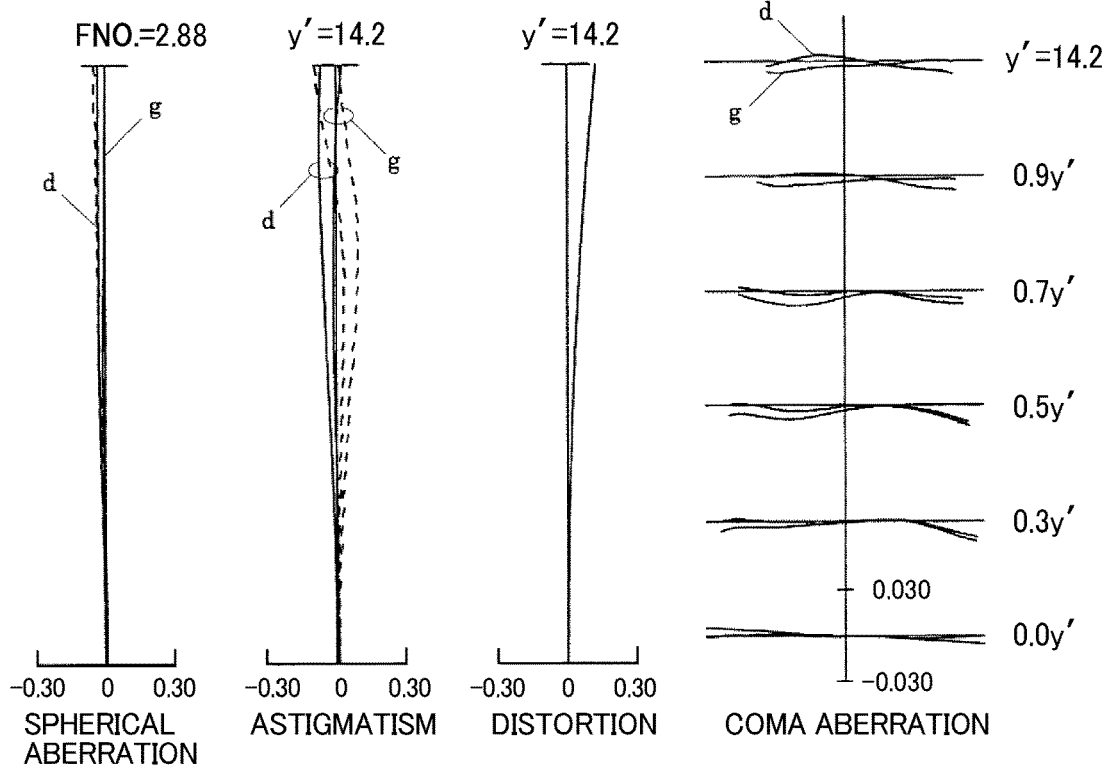
FIG. 14 is a collection of aberration curve diagrams of the imaging lens according to the fourth numerical example.
Figure 15:
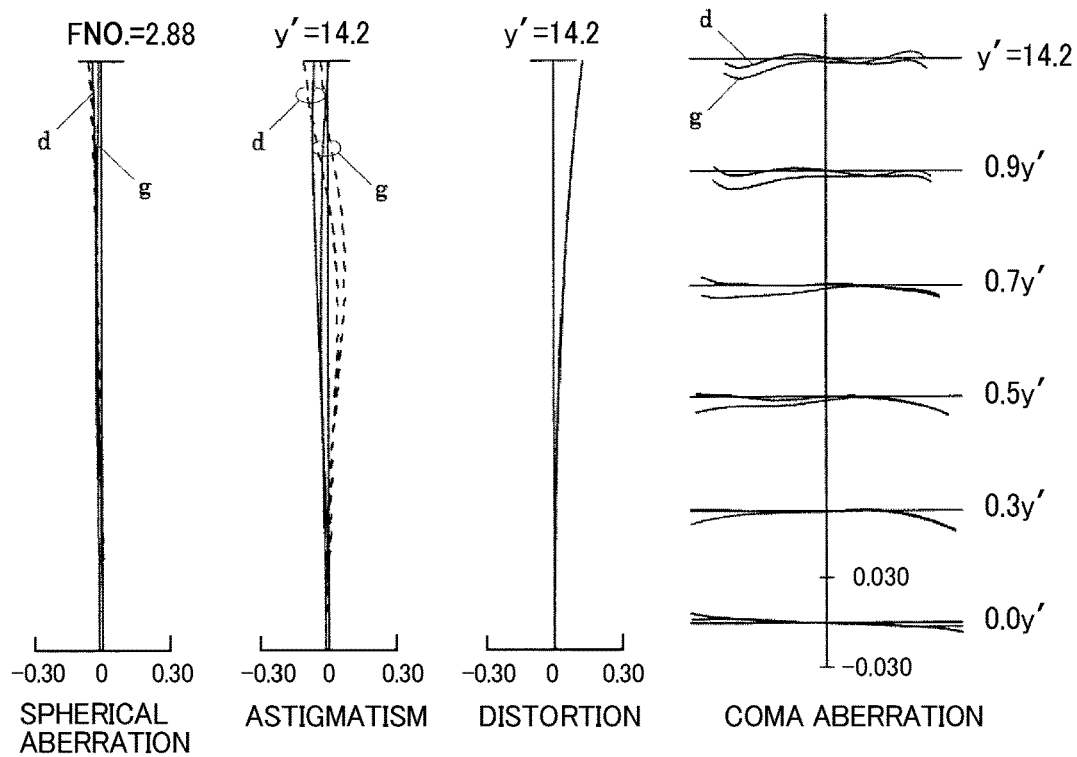
FIG. 15 is a collection of aberration curve diagrams of the imaging lens according to the fifth numerical example.
Figure 16:
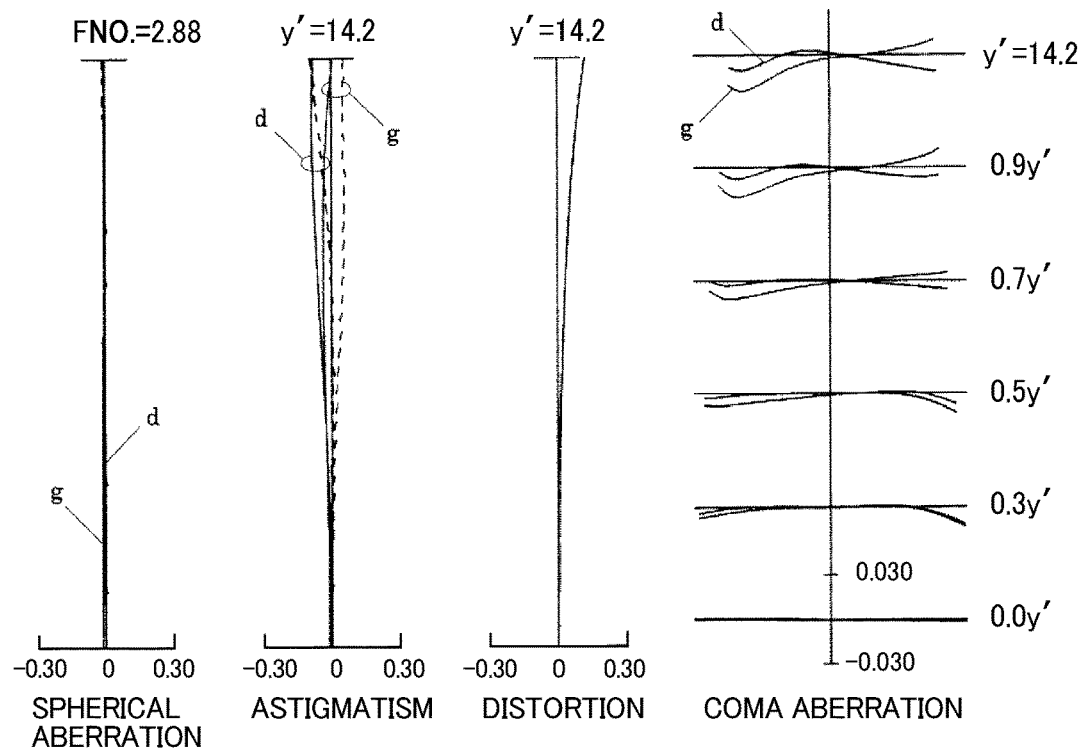
FIG. 16 is a collection of aberration curve diagrams of the imaging lens according to the sixth numerical example.
Figure 17:
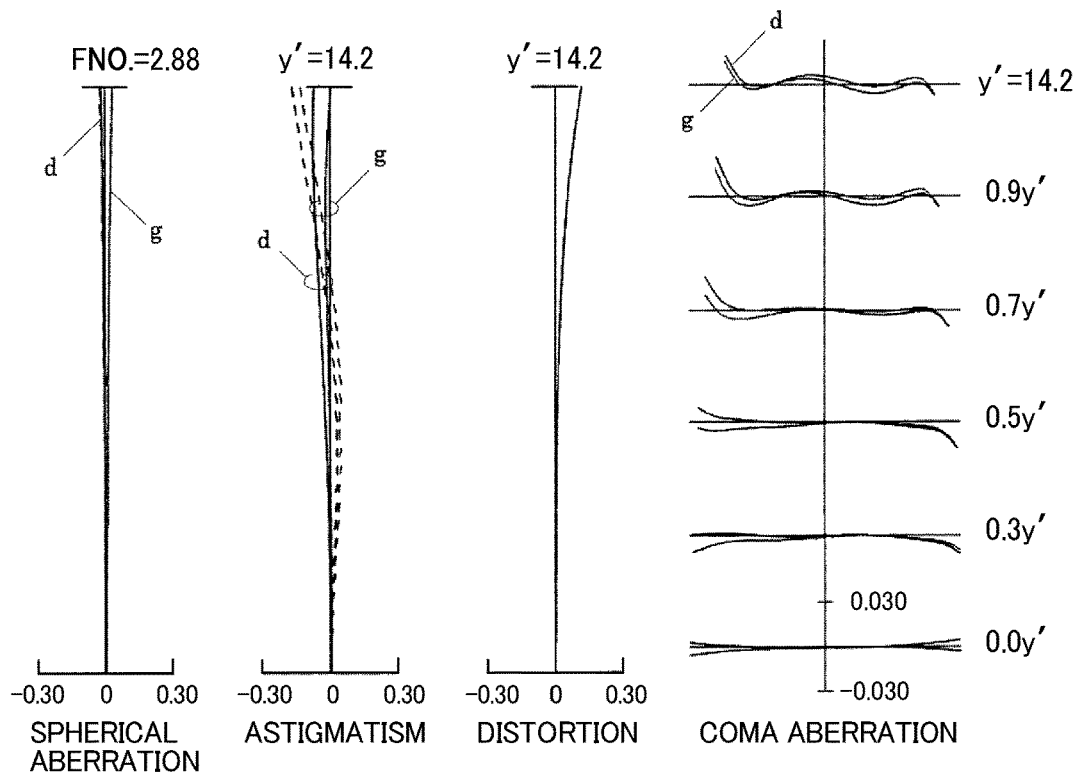
FIG. 17 is a collection of aberration curve diagrams of the imaging lens according to the seventh numerical example.
Figure 18:
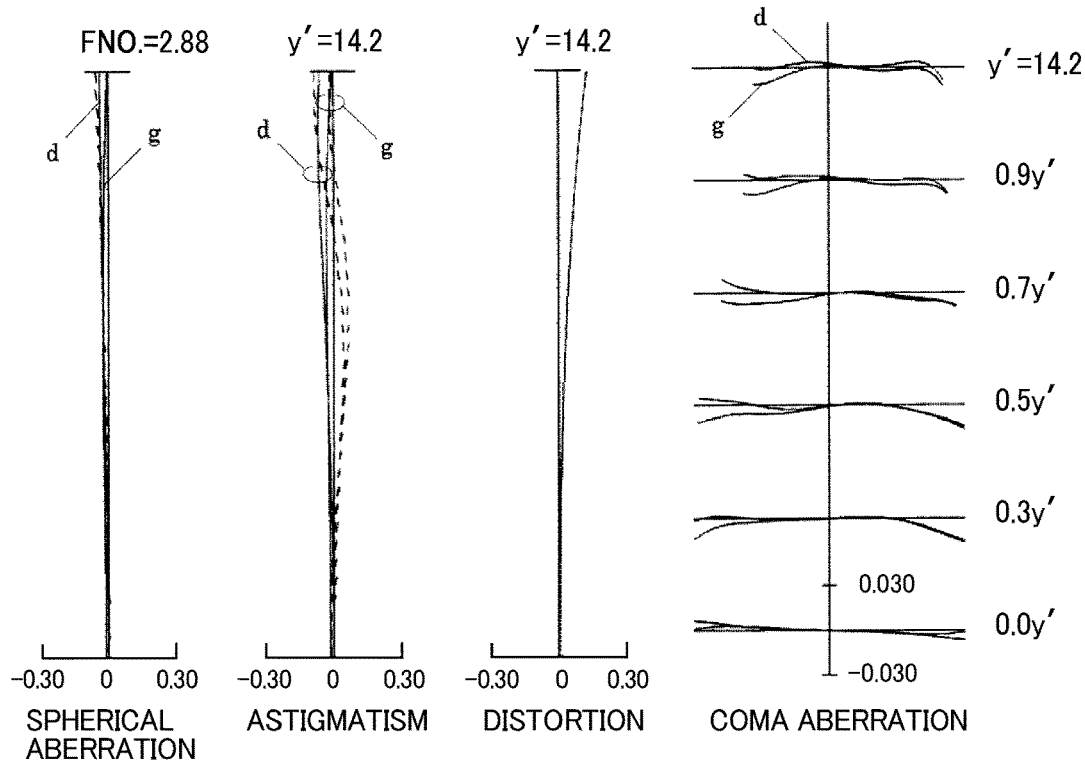
FIG. 18 is a collection of aberration curve diagrams of the imaging lens according to the eighth numerical example.
Figure 19:
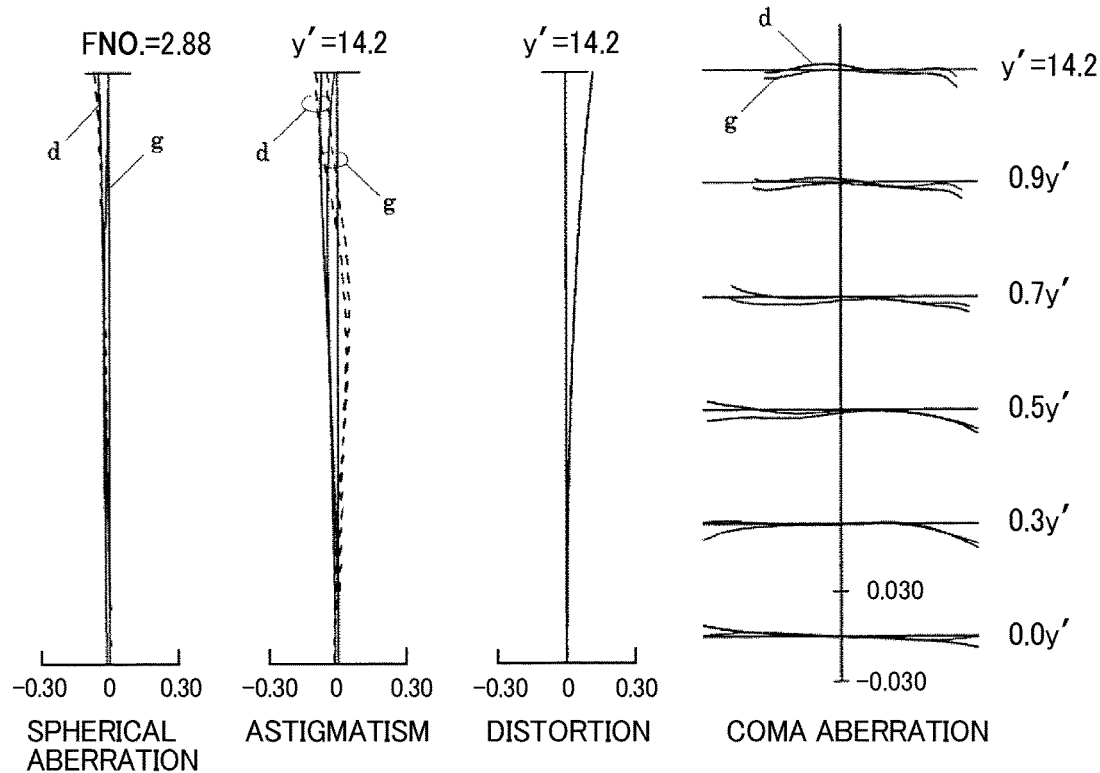
FIG. 19 is a collection of aberration curve diagrams of the imaging lens according to the ninth numerical example.
Figure 20:
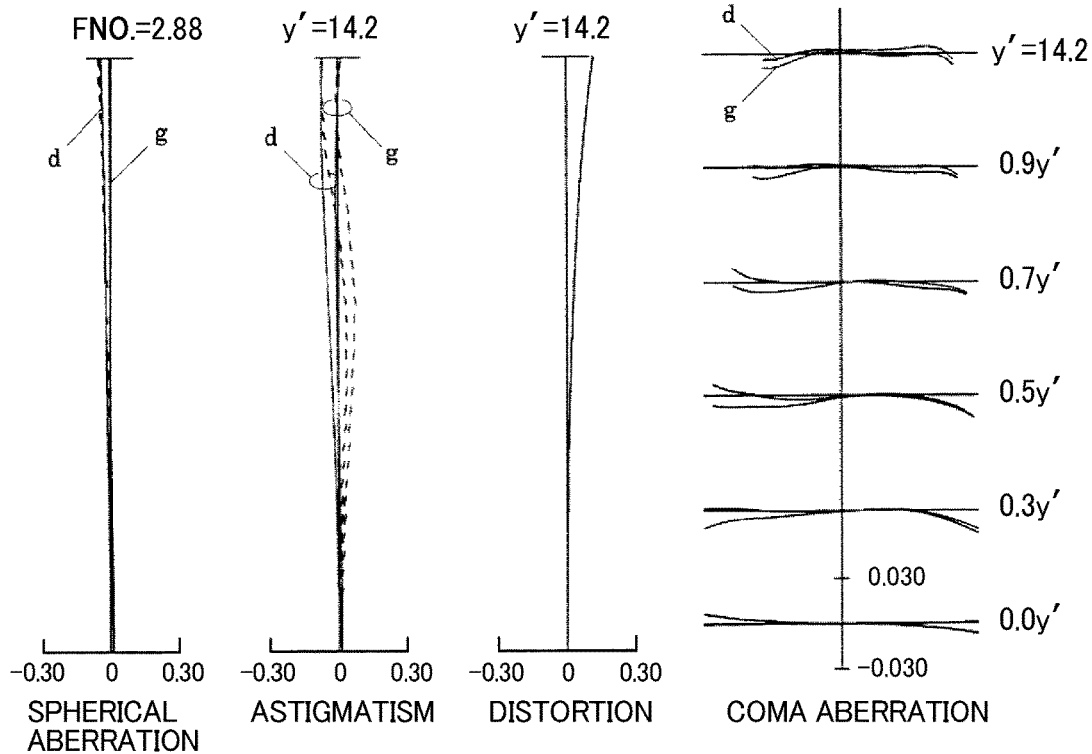
FIG. 20 is a collection of aberration curve diagrams of the imaging lens according to the tenth numerical example.

FIG. 10 is an illustration of a configuration of an imaging lens IL according to the tenth numerical example. As illustrated in FIG. 10, the first lens group I consists of four lenses of lenses LI1, LI2, LI3, and LI4, and the second lens group II consists of four lenses of lenses LII1, LII2, LII3, and LII4.

The air lens ALI included in the first lens group I is formed by the lens LI2 and the lens LI3 and has a biconvex shape.

The air lens ALII included in the second lens group II is formed by the lens LII2 and the lens LII3 and has a biconvex shape.

When the whole system of the imaging lens IL in FIG. 10 is observed, the whole system includes four air lenses in total: the above-described air lenses ALI and ALII; an air lens formed by the lens LI3 and the lens LI4; and an air lens formed by the lens LI4 and the lens LII1. The air lenses except the air lenses ALI and ALII do not have negative refractive power.

The lens LI1 and the lens LI2 of the first lens group I are cemented together to form a compound lens, and the lens LII1 and the lens LII2 of the second lens group II are also cemented together to form a compound lens.

The following describes the data of the tenth numerical example.

| f = 26.05, FNO. = 2.88, ω = 28.3 | | | | | | |
|---|---|---|---|---|---|---|
| Surface Number | R | D | Nd | vd | $P_{g,F}$ | Glass Type |
| 01* | 9.067 | 2.47 | 1.85400 | 40.38 | 0.5688 | OHARA L-LAH85V |
| 02 | 16.326 | 0.70 | 1.76182 | 26.52 | 0.6136 | OHARA S-TIH14 |
| 03 | 7.495 | 2.33 | | | | |
| 04 | −22.619 | 0.70 | 1.63980 | 34.47 | 0.5922 | OHARA S-TIM27 |
| 05 | 60.949 | 0.10 | | | | |
| 06 | 19.213 | 1.68 | 1.88300 | 40.69 | 0.5673 | HIKARI J-LASF08A |
| 07 | −77.308 | 1.20 | | | | |
| 08 | ∞(STOP) | 1.20 | | | | |
| 09 | 23.071 | 2.42 | 1.72000 | 50.23 | 0.5521 | OHARA S-LAL10 |
| 10 | −8.936 | 0.60 | 1.54814 | 45.78 | 0.5686 | OHARA S-TIL1 |
| 11 | 34.120 | 1.12 | | | | |
| 12 | −18.290 | 0.70 | 1.67270 | 32.17 | 0.5962 | HOYA E-FD5 |
| 13 | −897.000 | 1.29 | 1.88202 | 37.22 | 0.5769 | HOYA M-TAFD307 |

-continued

| f = 26.05, FNO. = 2.88, ω = 28.3 | | | | | | |
|---|---|---|---|---|---|---|
| Surface Number | R | D | Nd | vd | $P_{g,F}$ | Glass Type |
| 14* | −35.676 | 14.581 | | | | |
| 15 | ∞ | 1.40 | 1.51633 | 64.14 | | various kinds of filter |
| 16 | ∞ | | | | | |

The data for the aspherical surfaces is indicated as follows.

The First Surface $K=0.0$, $A4=-2.57013\times10^{-5}$, $A6=-5.79335\times10^{-7}$, $A8=5.88906\times10^{-9}$, $A10=-2.51234\times10^{-10}$ The 14th Surface $K=0.0$, $A4=1.20805\times10^{-4}$, $A6=-1.48753\times10^{-7}$, $A8=3.11246\times10^{-8}$, $A10=-3.68347\times10^{-10}$ The parameter values of the conditional expressions listed above are as follows:

$(r1o+r1i)/(r1o-r1i)=-0.502$ (1)

$(r2o+r2i)/(r2o-r2i)=0.302$ (2)

$L/f=1.273$ (3)

$DT/f=0.634$ (4)

$r1F/f=0.348$ (5)

$r1F/r1O=1.210$ (6)

$r2s/r1s=-0.298$ (7)

$f1/f2=1.183$ (8)

$Y'/f=0.545$ (9)

$\tan(\theta P \max)=0.650$ (10)

$r2R/f=-1.370$ (11)

$nd1P=1.854$ (12)

FIGS. 11 to 20 sequentially illustrate the aberration diagrams according to the first numerical example to the tenth numerical example.

In the aberration curves, broken lines in spherical aberration indicates "sine condition", and solid lines and broken lines in astigmatism indicate "sagittal" and "meridional", respectively. As illustrated in FIGS. 11 to 20, the aberrations are corrected at a high level in the above multiple examples of the present disclosure, and the spherical aberrations and axial chromatic aberrations are very small. The astigmatism, curvature of field, and lateral chromatic aberration are also sufficiently small, and the coma aberration and variance in color difference are also well controlled to the peripheral edge. The distortion is reduced to 1.5% or less at the absolute value.

The imaging lenses according to the first numerical example to the tenth numerical example each have a half angle of view in a range of from about 25 to about 33 degrees, which indicates a semi-wide angle range; has an F-number of less than 3.0, which indicates a large aperture diameter; attains decreases in sizes for all the lens total length, lens total thickness, and lens diameter; has excellent imaging performance; and is applicable to an image sensor having a resolving power of 24,000,000 pixels or more.

Hereinafter, embodiments of the mobile information terminal apparatus are described with reference to FIGS. 21A, 21B, 21C and 22.

An apparatus 30 described below is configured to transmit information, and is a mobile information terminal apparatus. The mobile information terminal apparatus 30 has a camera function, and uses an imaging lens according to any one of Example 1 to Example 10 as an image-capturing optical system of a camera function device of the camera function.

Figure 22:
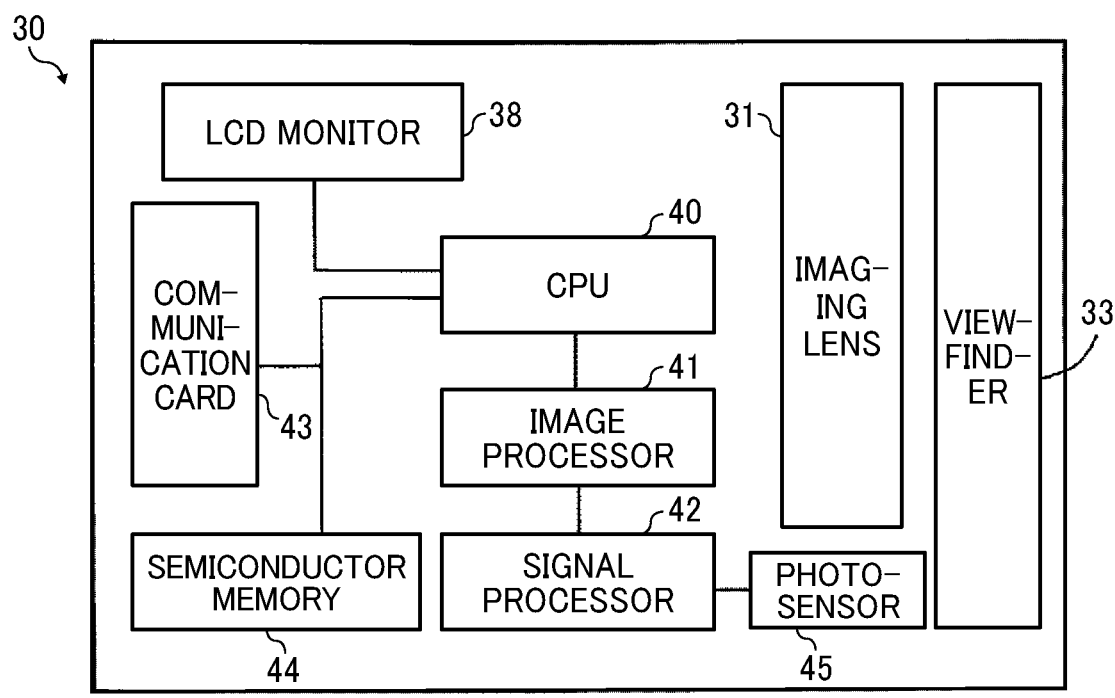
FIG. 22 is a block diagram of a system configuration of the mobile information terminal apparatus of FIGS. 21A, 21B, 21C.

As illustrated in a system diagram in FIG. 22, the camera function device in the mobile information terminal apparatus 30 includes an imaging lens 31 serving as an image-capturing optical system, and a photosensor 45 that is an imaging element (area sensor). The camera function device is configured to form an image of an image-capturing object on the photosensor 45 by the imaging lens 31, and to read the image by the photosensor 45.

An output from the photosensor 45 is processed by a signal processor 42 that is controlled by a central processing unit (CPU) 40 to be converted into digital information. Image information digitized by the signal processor 42 is processed with predetermined image processing by an image processor 41 that is controlled by the CPU 40, and then is recorded in a semiconductor memory 44.

A liquid crystal display (LCD) monitor 38 can display an image during image-capturing, and can display an image recorded in the semiconductor memory 44. Moreover, the image recorded in the semiconductor memory 44 can be transmitted to an external device using a communication card 43 or the like. Moreover, an image or information received via the communication card 43 or the like from an external device can be stored in the semiconductor memory 44, and the LCD monitor 38 can display the image or information.

Figure 21A:
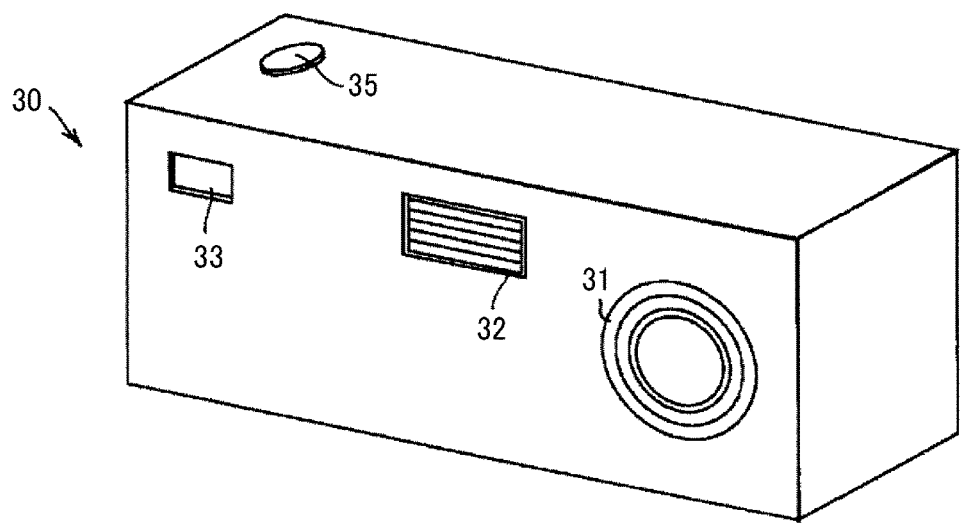
FIG. 21A is an external view of a mobile information terminal apparatus according to an embodiment.
Figure 21B:
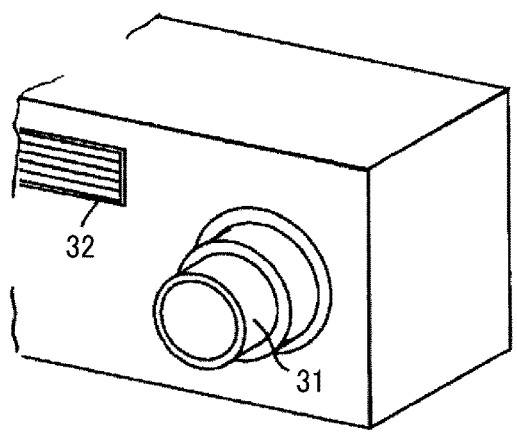
FIG. 21B is another external view of a mobile information terminal apparatus according to an embodiment.
Figure 21C:
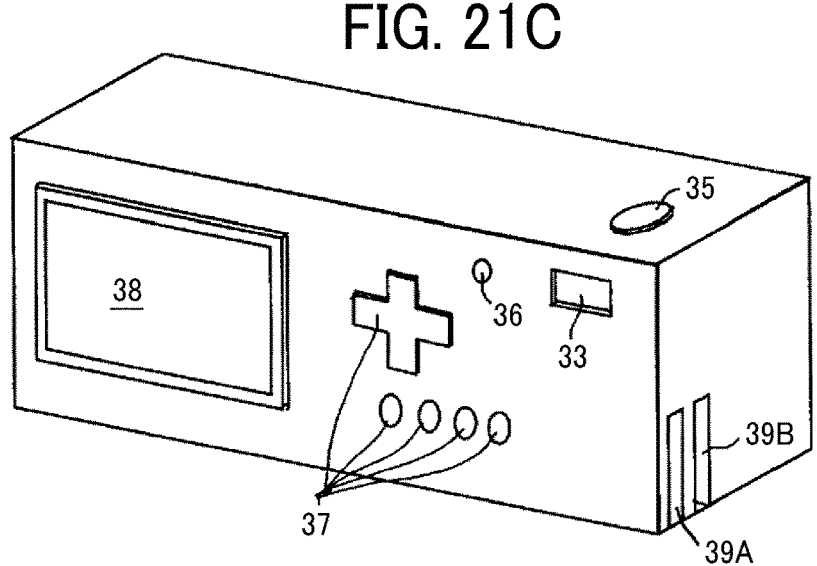
FIG. 21C is another external view of a mobile information terminal apparatus according to an embodiment.

Referring to FIGS. 21A to 21C, when the mobile information terminal apparatus 30 is carried, the imaging lens 31 is in a collapsed state as illustrated in FIG. 21A. When a user operates a power switch 36 (FIG. 21C) to turn on the mobile information terminal apparatus 30, a lens barrel is extended as illustrated in FIG. 21B.

When a shutter release button 35 is half-pressed, focusing is performed. Focusing can be performed through movement of the whole imaging lens 31 in the optical-axis direction, or through movement of the photosensor 45. When the shutter release button 35 is further pressed, image-capturing is performed, and then the above-described processing is performed.

To display an image recorded in the semiconductor memory 44 onto the LCD monitor 38 or to transmit the image to an external device using the communication card 43 or the like, an operation button 37 is operated. The semiconductor memory 44 and the communication card 43 or the like are inserted into slots 39A and 39B in FIG. 21C, which are respectively dedicated for or general and common to the semiconductor memory 44 and the communication card 43 or the like.

When the imaging lens 31 is in the collapsed state, the lens groups of the imaging lens 31 may not be aligned along the optical axis. For example, the imaging lens 31 may have a mechanism in which the second lens group II is retracted from the optical axis and housed in parallel to the first lens group I. This mechanism can make the mobile information terminal apparatus 30 thinner.

In addition, a zoom function is added to the camera function unit of the mobile information terminal apparatus described above, and a so-called digital zoom operation of pseudo-magnification by changing the cropping range of an image is performed by a zooming operation. In this case, a viewfinder 33 is also configured to change magnification with an angle of view.

Since the imaging lenses IL according to the above-described numerical examples are used for the image-forming lens, a compact camera (a mobile data terminal apparatus) with high image quality using a photosensor having 24,000,000 pixels or more can be provided.

Although the desirable embodiments and examples of the disclosure have been described above, the disclosure is not particularly limited to such specific embodiments and examples unless otherwise particularly limited in the above description, and various modifications and changes can be made without departing from the spirit and scope of the disclosure as set forth in the appended claims.

The advantageous effects described in the embodiments and examples of the disclosure are merely desirable advantageous effects generated based on the disclosure. The advantageous effects according to the disclosure is not limited to "those described in the embodiments and examples".

This patent application is based on and claims priority to Japanese Patent Application No. 2020-026382, filed on Feb. 19, 2020, in the Japan Patent Office, the entire disclosure of which is hereby incorporated by reference herein.

REFERENCE SIGNS LIST

Ax Optical axis of imaging lens
I First lens group
LI1 to LI5 Lenses of the first lens group
II Second lens group
LII1 to LII4 Lenses of the second lens group
S Aperture stop
F Various kinds of filters
Im Image plane

The invention claimed is:

1. An imaging lens, consisting:
a first lens group having a positive power, the first lens group including a positive lens closest to an object side within the first lens group;
an aperture stop;
a second lens group having a positive power, wherein
the first lens group, the aperture stop, and the second lens group are disposed in that order from the object side toward an image side,
a total number of air lenses included in the imaging lens is two to four,
the imaging lens includes two negative air lenses, no more or less, and each negative air lens has a biconvex shape,
the two negative air lenses include a first biconvex air lens and a second biconvex air lens,
the first lens group includes the first biconvex air lens, and
the second lens group includes the second biconvex air lens.

2. The imaging lens according to claim 1, wherein
the first lens group consists of three to five lenses including the first biconvex air lens, and
the second lens group consists of three to four lenses including the second biconvex air lens.

3. The imaging lens according to claim 1, wherein conditional expressions (1) and (2) below are satisfied:

$$-0.9 < (r1o+r1i)/(r1o-r1i) < -0.2 \qquad (1)$$

$$-0.2 < (r2o+r2i)/(r2o-r2i) < 0.9 \qquad (2)$$

where
r1o denotes a radius of curvature of an object-side surface of the first biconvex air lens in the first lens group,
r1i denotes a radius of curvature of an image-side surface of the first biconvex air lens in the first lens group,
r2o denotes a radius of curvature of an object-side surface of the second biconvex air lens in the second lens group, and
r2i denotes a radius of curvature of an image-side surface of the second biconvex air lens in the second lens group.

4. The imaging lens according to claim 1, wherein conditional expression (3) below is satisfied:

$$1.0 < L/f < 1.6 \quad (3)$$

where
L denotes a distance between a surface closest to the object within the first lens group and an imaging plane when the imaging lens is focused on the object at infinity, and
f denotes a focal length of the imaging lens focused on the object at infinity.

5. The imaging lens according to claim 1, wherein conditional expression (4) below is satisfied:

$$0.45 < DT/f < 0.80 \quad (4)$$

where
DT denotes a distance between a surface closest to the object within the first lens group and a surface closest to an image within the second lens group; and
f denotes a focal length of the imaging lens focused on the object at infinity.

6. The imaging lens according to claim 1, wherein
an object-side surface of the positive lens closest to the object within the first lens group is a convex surface, and conditional expression (5) below is satisfied:

$$0.25 < r1F/f < 0.55 \quad (5)$$

where
r1F denotes a radius of curvature of the object-side surface of the positive lens; and
f denotes a focal length of the imaging lens focused on the object at infinity.

7. The imaging lens according to claim 6, wherein conditional expression (6) below is satisfied:

$$0.8 < r1F/r1o < 1.6 \quad (6)$$

where
r1F denotes a radius of curvature of the object-side surface of the positive lens; and
r1o denotes the radius of curvature of the object-side surface of the first biconvex air lens in the first lens group.

8. The imaging lens according to claim 1, wherein a surface closest to an image within the first lens group and a surface closest to the object within the second lens group each are convex.

9. The imaging lens according to claim 8, wherein conditional expression (7) below is satisfied:

$$-1.4 < r2s/r1s < 0.0 \quad (7)$$

where
r1s denotes a radius of curvature of the surface closest to the image within the first lens group; and
r2s denotes a radius of curvature of the surface closest to the object within the second lens group.

10. A camera comprising:
the imaging lens according to claim 1, wherein
the imaging lens is an image-capturing optical system.

11. A mobile information terminal apparatus comprising:
a camera function unit including the imaging lens according to claim 1, wherein
the imaging lens is an image-capturing optical system.

* * * * *